US006945462B2

(12) United States Patent
Tsukuda et al.

(10) Patent No.: US 6,945,462 B2
(45) Date of Patent: Sep. 20, 2005

(54) OPTICAL INFORMATION READING APPARATUS

(75) Inventors: Sachio Tsukuda, Kawaguchi (JP); Susumu Nakano, Ome (JP)

(73) Assignee: Optoelectronics Co., Ltd., Warabi (JP)

( * ) Notice: Subject to any disclaimer, the term of this patent is extended or adjusted under 35 U.S.C. 154(b) by 0 days.

(21) Appl. No.: 10/478,665

(22) PCT Filed: May 24, 2002

(86) PCT No.: PCT/JP02/05074

§ 371 (c)(1),
(2), (4) Date: Nov. 24, 2003

(87) PCT Pub. No.: WO02/097711

PCT Pub. Date: Dec. 5, 2002

(65) Prior Publication Data

US 2005/0173538 A1  Aug. 11, 2005

(30) Foreign Application Priority Data

May 25, 2001  (JP) .............................. 2001-157622

(51) Int. Cl.[7] .............................................. G06K 7/10
(52) U.S. Cl. ..................... 235/462.06; 235/462.19; 235/462.25; 235/462.28; 235/462.29
(58) Field of Search ...................... 235/462.01–462.49

(56) References Cited

U.S. PATENT DOCUMENTS

| | | | | |
|---|---|---|---|---|
| 4,816,660 A | * | 3/1989 | Swartz et al. | 235/462.21 |
| 4,825,057 A | * | 4/1989 | Swartz et al. | 235/472.01 |
| 5,015,833 A | * | 5/1991 | Shepard et al. | 235/462.07 |
| 5,675,136 A | | 10/1997 | Keinath et al. | |
| 5,767,497 A | | 6/1998 | Lei | |
| 6,085,981 A | | 7/2000 | Knowles et al. | |
| 6,829,007 B1 | * | 12/2004 | Bilhan et al. | 348/243 |

FOREIGN PATENT DOCUMENTS

| | | |
|---|---|---|
| JP | 52-136507 | 11/1977 |
| JP | 61-290578 | 12/1986 |
| JP | 63-196990 | 8/1988 |
| JP | 5-210753 | 8/1993 |
| JP | 6-187480 | 7/1994 |
| JP | 6-195496 | 7/1994 |
| JP | 7-218565 | 8/1995 |
| JP | 8-147402 | 6/1996 |
| JP | 11-259592 | 9/1999 |
| JP | 2000-163113 | 6/2000 |

OTHER PUBLICATIONS

European Search Report dated Nov. 8, 2004.

* cited by examiner

*Primary Examiner*—Thien M. Le
*Assistant Examiner*—Kimberly D. Nguyen
(74) *Attorney, Agent, or Firm*—Westerman, Hattori, Daniels & Adrian, LLP

(57) ABSTRACT

An optical information reading apparatus applies light to an object to be read such as a bar code symbol, photoelectrically converts by a photodetector element a light image formed by the reflection light, and processes the obtained electric signal to output code data. Among the portions performing the signal processing, at least a data converter (13) for converting a photoelectrically converted electric signal into a digital signal, a digital signal calculation unit (17) for calculating the digital signal and generating code data indicating information of an object to be read, an input accumulation unit (20) for accumulating the code data, and a timing control unit (12) for controlling operation timings of these components are arranged on a single substrate as a multipurpose processing circuit block (10).

16 Claims, 27 Drawing Sheets

F I G. 6
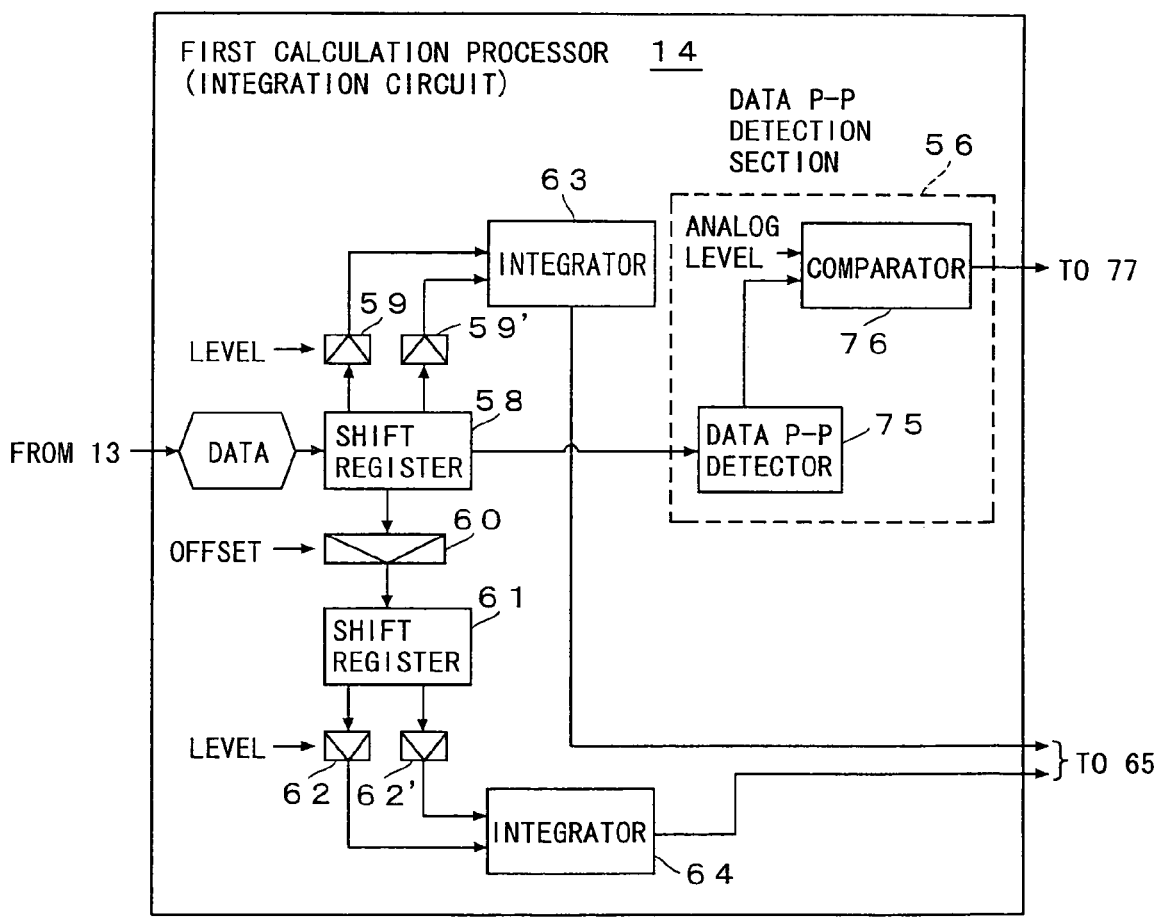

F I G. 7
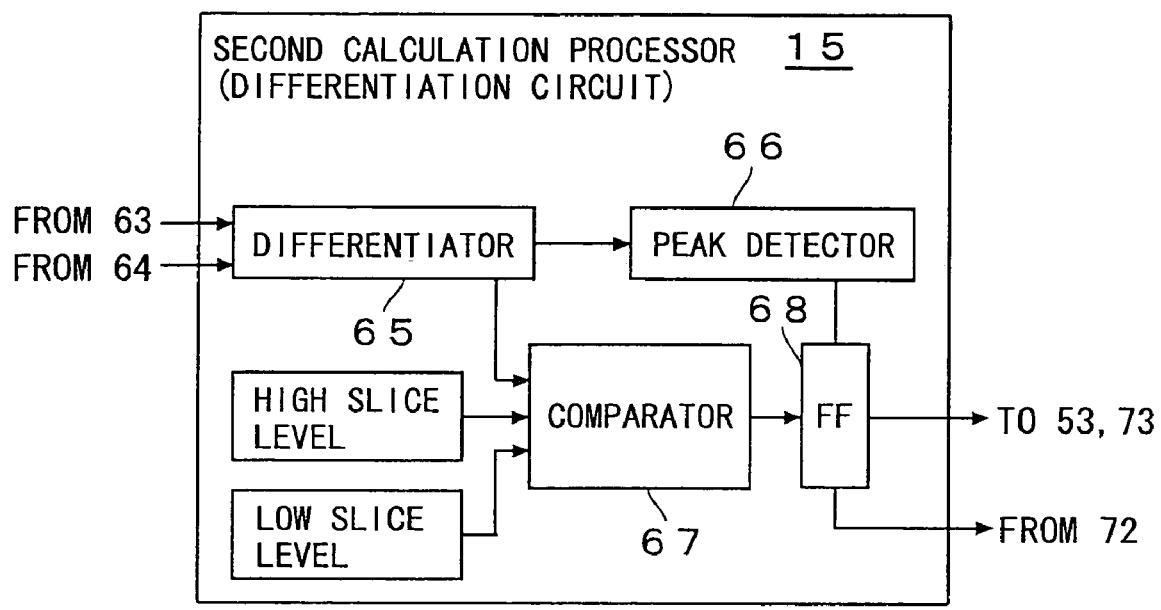
F I G. 8
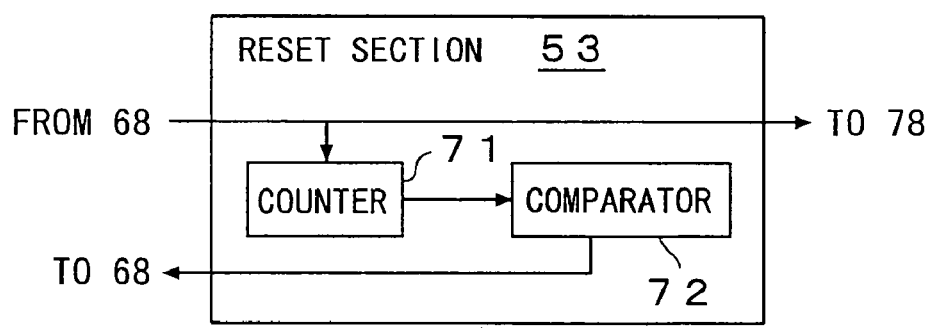

THEORETICAL DIAGRAM FOR DIFFERENTIAL METHOD

F I G. 2 2
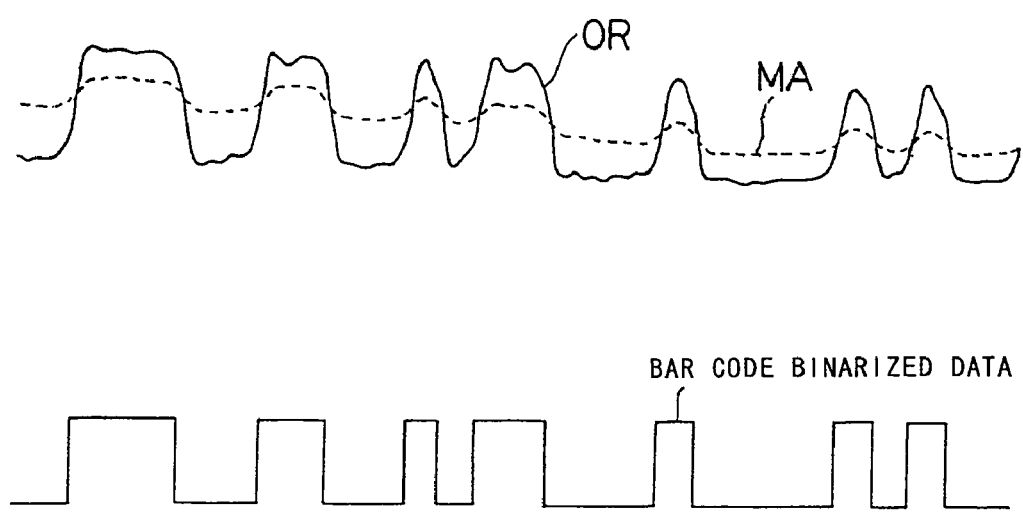

BEFORE CHANGING WEIGHTED AMOUNT

AFTER CHANGING WEIGHTED AMOUNT

BEFORE CHANGING FREQUENCY CHARACTERISTICS

AFTER CHANGING FREQUENCY CHARACTERISTICS

F I G. 3 0
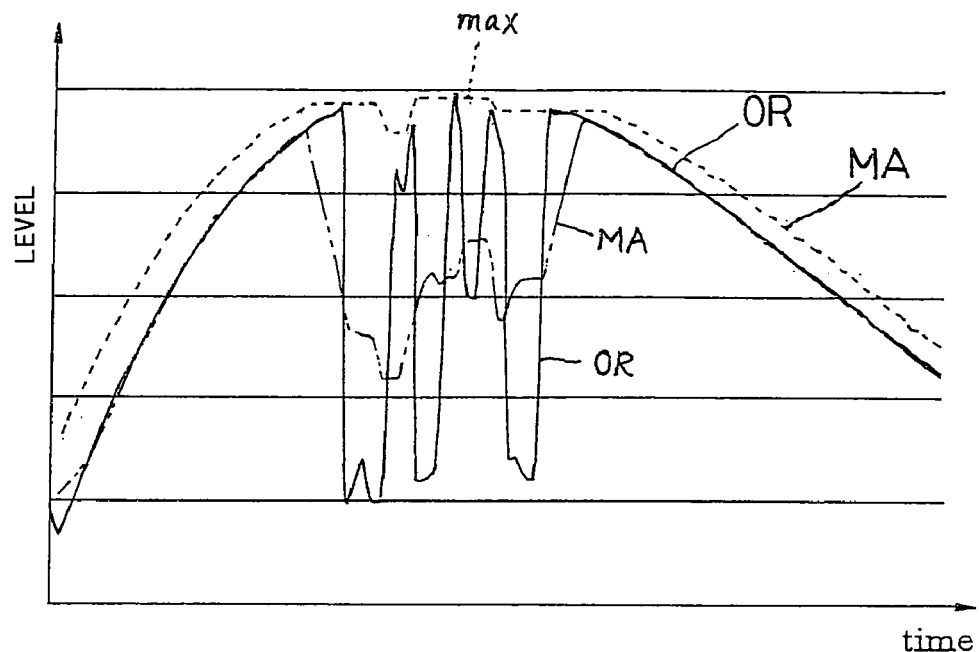
WAVEFORM PASSING THROUGH MAXIMUM VALUE CIRCUIT
F I G. 3 1
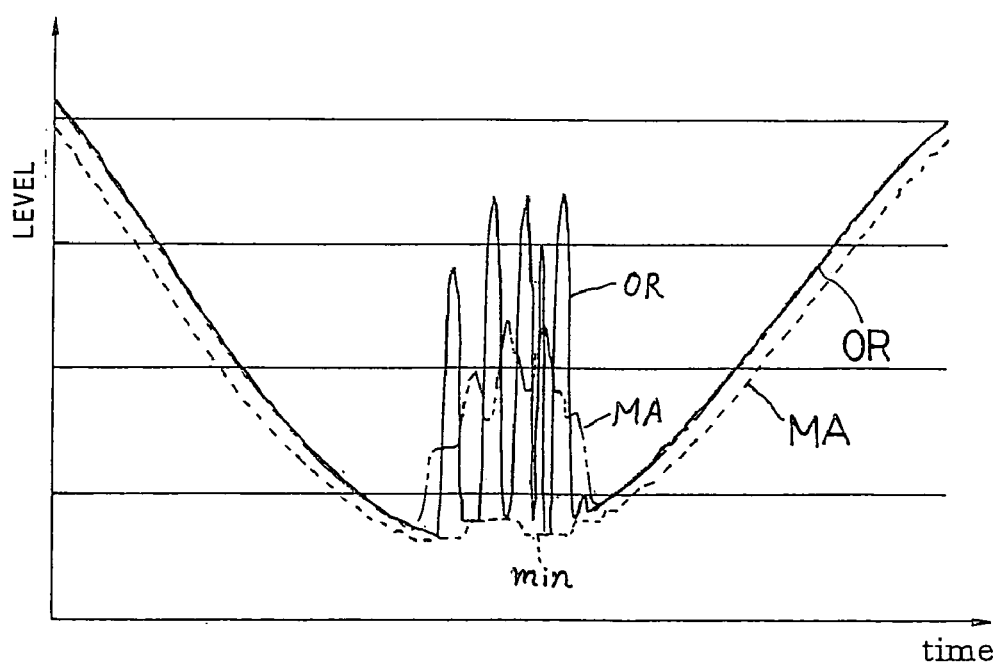
WAVEFORM PASSING THROUGH MINIMUM VALUE CIRCUIT

WAVEFORM WHEN HIGHLY WEIGHTING STAGE IS ADDED

WAVEFORM WHEN HIGHLY WEIGHTING STAGE IS REDUCED

WAVEFORM IN ACCORDANCE WITH CHANGES OF COEFFICIENT M

F I G. 4 0
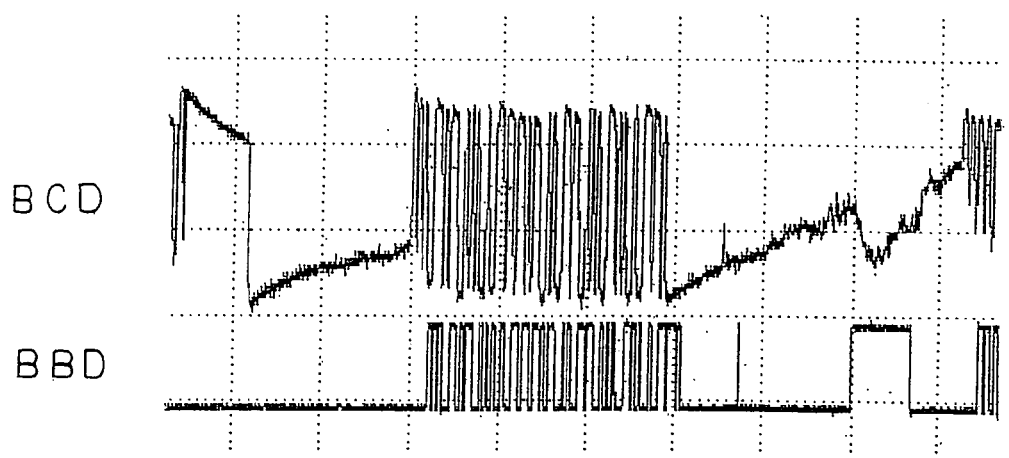
F I G. 4 1
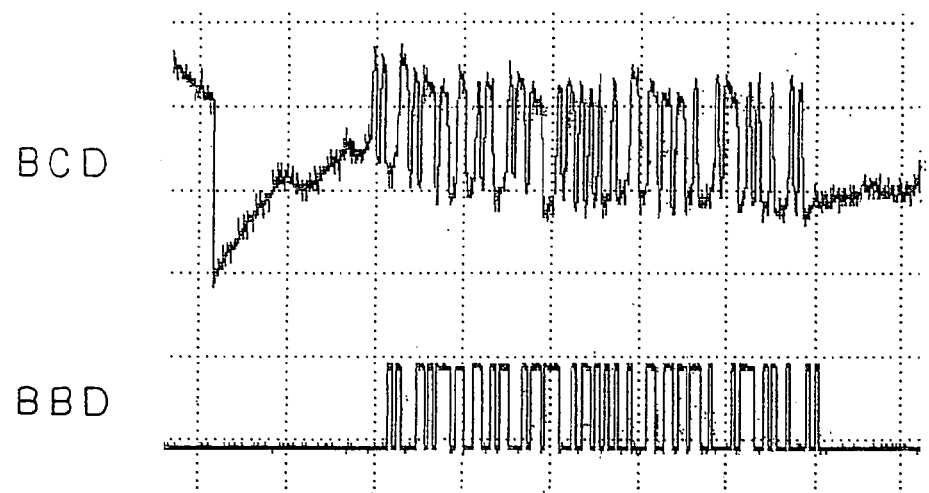
F I G. 4 2
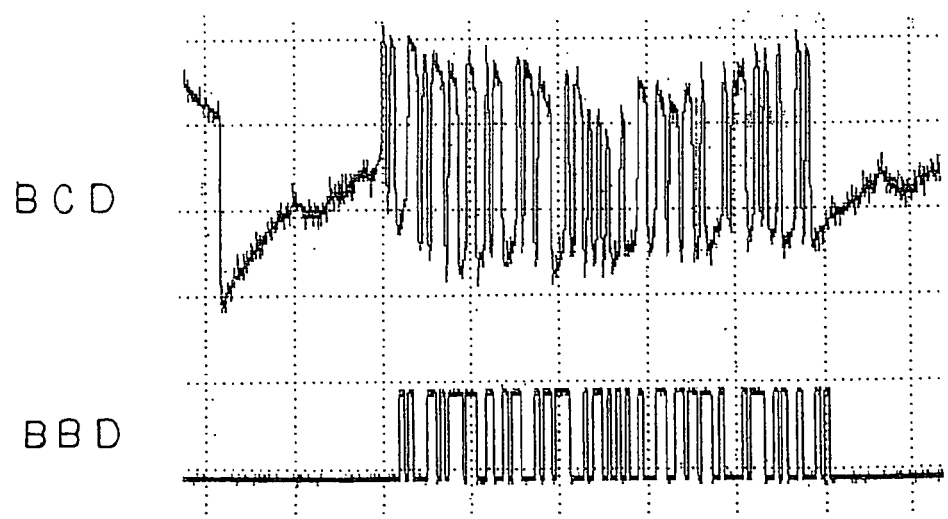

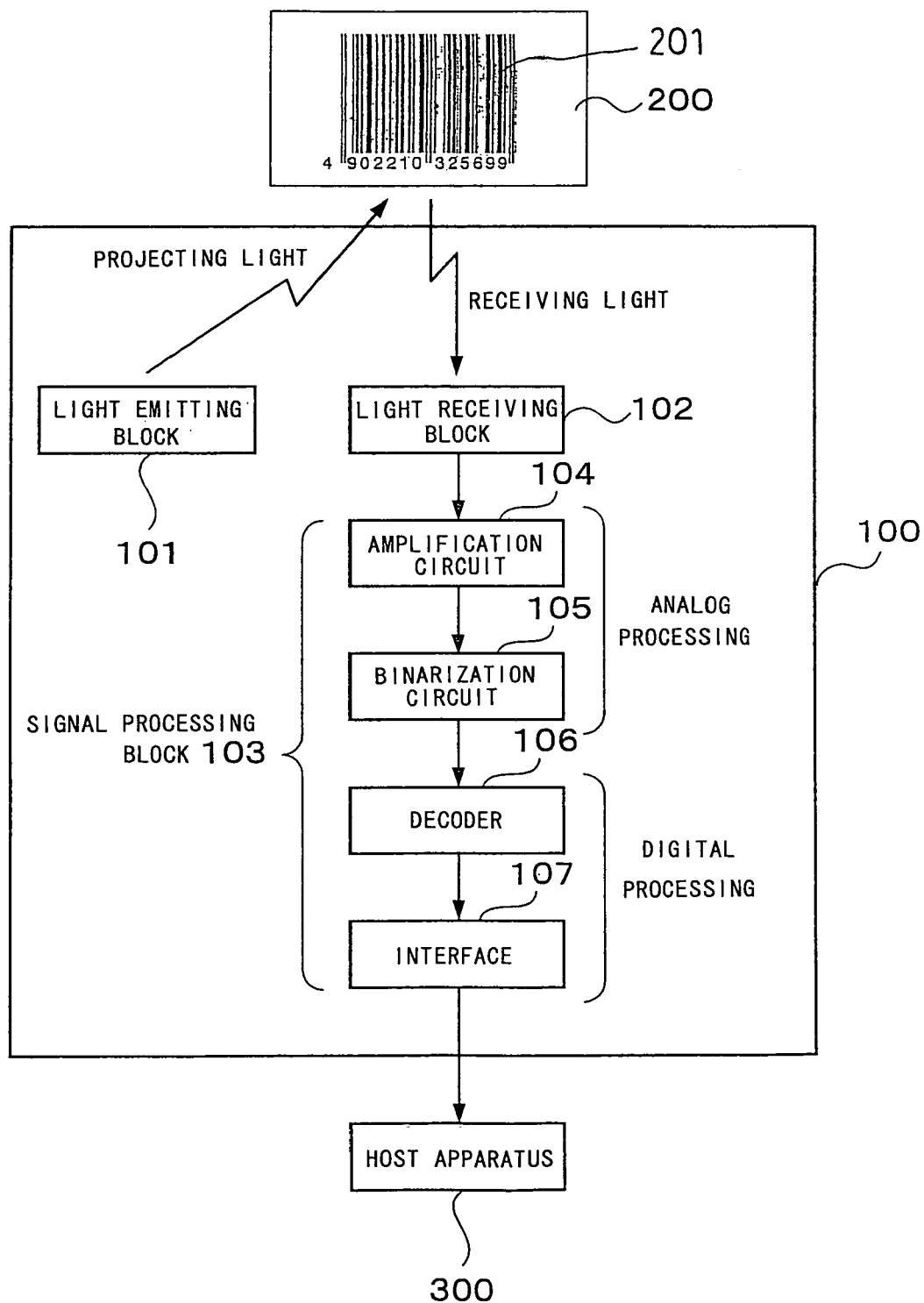

OPTICAL INFORMATION READING APPARATUS

TECHNICAL FIELD

The present invention relates to an optical information processing apparatus that optically reads information of an object to be read having portions with different light reflectances and outputs code data indicating the information of the object to be read and, more specifically, to an optical information reading apparatus suitable for a bar code reader that reads a barcode symbol.

BACKGROUND TECHNOLOGY

Generally widely used optical information reading apparatuses such as a bar code reader and the like include an apparatus using a light emitting diode (LED) as a light source, using a CCD image sensor as a photodetector element to perform photoelectrical conversion, and processing a resulting converted electric signal, an apparatus using laser light as a light source, receiving and photoelectrically converting reflected light of the laser light, and processing a resulting electric signal, and so on.

These optical information reading apparatuses are typically configured as shown in FIG. 43. Specifically, an optical information reading apparatus 100 comprises a light emitting block 101 having a light source such as an LED, a semiconductor laser, or the like, a light receiving block 102 composed of a CCD image sensor or the like, and a signal processing block 103.

The light emitting block 101 projects light to an object to be read 200 having portions with different light reflectances such as a bar code symbol 201 or the like, the light receiving block 102 receives reflected light from the object to be read 200 and photoelectrically converts it, the signal processing block 103 processes a resulting electric signal, recognizes information of the bar code or the like, and sends its code data to a host apparatus 300 such as a personal computer or the like.

The signal processing block 103 comprises an amplification circuit 104, a binarization circuit 105, a decoder 106, and an interface 107. Conventionally, a signal has generally been subjected to analog processing in the amplification circuit 104 and the binarization circuit 105, and to digital processing in the decoder 106 and the interface 107.

The decoder 106 recognizes a bar code or the like, converts it into code data, and sends the data to the host apparatus 300 via the interface 107.

Such an optical information reading apparatus 100 using an LED as the light source of the light emitting block 102 and using a CCD image sensor as the light receiving block 102 is found, for example, in JP H6-187480 A.

Further, an optical information reading apparatus similarly using a CCD image sensor as a light receiving block, in which a calculation circuit block being a signal processing block for processing an electric signal which has been photoelectrically converted in the light receiving block includes a logarithmic amplifier, a slice signal generation circuit, and a comparison circuit so as to enable control capable of quickly responding to a transient or instantaneous change of disturbance light while maintaining wide dynamic range characteristics, thereby reading accurate optical information, is found in JP H6-195496 A.

Besides, an optical information reading apparatus using a laser light source such as a semiconductor laser as a light source of a light emitting block is found, for example, in JP H11-259592 A. Also in the optical information reading apparatus, signal processing after photoelectric conversion in a light receiving block is analog processing through use of an amplification circuit and a binarization circuit and thereafter digital processing in a decoder and an interface.

The signal processing in the above-described conventional optical information reading apparatuses, however, have the following problems:

① the processing performance tends to vary with a change in amplification rate, temperature, or the like;

② when a signal to be binarized in the binarization circuit is subjected to analog processing, the processing performance tends to vary due to variations of parts of the binarization circuit; and ③ the conventional optical information reading apparatus including the processing circuit of this kind has a large number of parts and therefore tends to cause variations in accuracy of quality, have a relatively large size, and increase in cost.

The present invention is made to solve those problems, and an object of the invention is to improve the signal processing performance in the above-described optical information reading apparatus, so as to increase the reliability of reading information such as a bar code symbol or the like being an object to be read and, in addition, to realize a reduction in size and cost of the reading apparatus.

As more specific points, the invention has the following objects:

① to eliminate variations in processing performance by avoiding influence of variable factors such as a change in amplification rate, temperature, and so on;

② to eliminate variations in processing performance by reducing the number of parts of a processing circuit;

③ to improve reading performance by avoiding influence of the printing quality (gradation or the like) of a bar code symbol or the like being an object to be read;

④ to reduce size and manufacturing cost of the optical information reading apparatus itself;

⑤ to enable easy selection of various kinds of digital processing by employing a new calculation circuit (multipurpose processing circuit); and ⑥ to reduce voltage and power consumption of the calculation circuit block.

DISCLOSURE OF THE INVENTION

To achieve the above-described objects, the invention is an optical information reading apparatus, comprising: a light projection means for projecting light to an object to be read having portions with different light reflectances; an optical system for forming an image of reflected light from the object to be read on a light receiving position; a photoelectric conversion means located at the light receiving position for photoelectrically converting the light image made of the reflected light and outputting an electric signal; and a calculation means for calculating the electric signal outputted from the photoelectric conversion means and outputting bar code binarized data indicating information of the object to be read, wherein the calculation means is configured as follows:

The calculation means forms a multipurpose processing circuit by integrally providing, on a single substrate, the following (a) to (d):

(a) a data conversion unit for converting the electric signal into a digital signal;

(b) a digital signal calculation unit having a calculation processor for calculating the digital signal converted by said data converter and generating bar code binarized data, a data correction section for correcting the bar code binarized data, and a noise reduction section for reducing the noise, for outputting the bar code binarized data indicating information of the object to be read;

(c) an input accumulation unit for accumulating the bar code binarized data output from said digital signal calculation unit; and (d) a timing control unit for controlling operation timings of the light projection means, the photoelectric conversion means, the data conversion unit, the digital signal calculation unit, and the input accumulation unit.

It is preferable that the multipurpose processing circuit is integrally formed on the single substrate while also including a central processing unit (CPU) for centrally controlling respective units of the calculation means.

Further, it is possible that the calculation unit of the optical information reading apparatus comprises: a first calculation processor for calculating the digital signal converted by the data conversion unit; a second calculation processor for generating the bar code binarized data from data calculated by the first calculation processor.

Further, it is possible that a processing circuit of the first calculation processor comprises an integration circuit, and a processing circuit of the second calculation processor comprises a differentiation circuit and a binarization circuit.

In this case, it is preferable that at least one of the first calculation processor and the second calculation processor is provided with one or more of following ① to ⑥:

① means for varying a differential time (Δt) in the differentiation circuit of the second calculation processor;

② means for eliminating or reducing noise;

③ means for minimizing a difference in total data due to buffer selection;

④ means for eliminating noise components by comparison with an analog signal;

⑤ means for erasing binary data with an arbitrary pulse width or less; and

⑥ means for forcibly resetting binary data at a high level ("H") continuing for a predetermined length or longer.

Alternatively, it is adoptable that a processing circuit of the first calculation processor comprises a moving average circuit, and a processing circuit of the second calculation processor comprises a binarization circuit.

In this case, it is desirable that the first calculation processor is provided with plural means of following (1) to (10):

(1) means for changing a moving average sampling width;
(2) means for taking a weighted moving average;
(3) means for separating the moving average circuit into two parts;
(4) means for changing a weighted amount of a weighted moving average;
(5) means for changing frequency response of a weighted moving average;
(6) means for selecting a maximum value or a minimum value in moving average sampling data;
(7) means for thinning out moving average sampling data;
(8) means for interpolating moving average sampling data;
(9) means for reducing a total of high frequency components from a total of low frequency components in a weighted moving average; and
(10) means for changing M (a total divisor) of a weighted moving average.

In contrast to the conventional optical information reading apparatus in which processing until binarization processing (converting gradations such as black and white printed data of a bar code symbol into a digital signal composed of "1" and "0") is implemented by analog processing, the optical information reading apparatus according to the invention is configured such that analog processing is performed on a photoelectrically converted electric signal in a very limited part, and A/D conversion, binarization processing, decoding, interface processing are implemented by digital processing by the multipurpose processing circuit which is formed on a single substrate, thereby achieving the above-described objects.

It should be noted that the "substrate" in the invention includes not only a substrate of a printed circuit board but also a semiconductor substrate on which a semiconductor integrated circuit (IC or LSI) is formed.

BRIEF DESCRIPTION OF DRAWINGS

FIG. 6 is a block diagram showing a specific configuration example of a first calculation processor in FIG. 5;

FIG. 7 is a block diagram showing a specific configuration example of a second calculation processor in FIG. 5;

FIG. 8 is a block diagram showing a specific configuration example of a reset section in FIG. 5;

FIG. 22 is a waveform chart showing the relationship between an original signal (input signal) and a signal made by multiplying the original signal by a moving average and bar code binarized data when the bar code binarized data is generated using a moving average circuit;

FIG. 30 is a waveform chart of a signal made by multiplying input data by a weighted moving average which has passed through a maximum value circuit in the case of addition of a function of selecting a maximum/minimum value in sample data when the weighted moving average method is employed;

FIG. 31 is a waveform chart of a signal made by multiplying input data by a weighted moving average which has passed through a minimum value circuit in the same case as in FIG. 30;

FIG. 40 is a waveform chart in the case of a low temperature in the same case as in FIG. 39;

FIG. 41 is a waveform chart of bar code data when the printing density is low and binarized data thereof, for explaining the effect of not being affected by the printing quality of a bar code symbol according to the invention;

FIG. 42 is a waveform chart when the printing density is high in the same case as in FIG. 41; and FIG. 43 is a block diagram showing a configuration example of a conventional optical information reading apparatus.

BEST MODE FOR CARRYING OUT THE INVENTION

Embodiments of an optical information reading apparatus according to the invention will be specifically described below with reference to the drawings.

Figure 1:
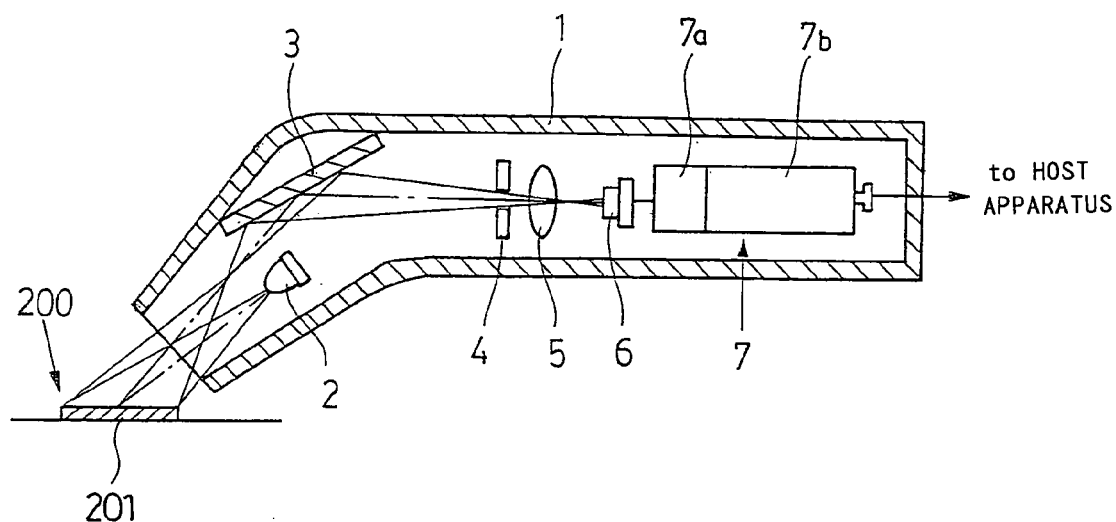
FIG. 1 is a schematic sectional side view showing an example of an optical information reading apparatus according to the invention using an LED as a light emitting block.

FIG. 1 is a schematic sectional side view showing an example of the optical information reading apparatus for reading a bar code symbol according to the invention, in which a light emitting diode (LED) is used as a light source of a light emitting block. The optical information reading apparatus includes an LED 2 being a light source as a light projection means, a reflector (mirror) 3, a slit 4, an imaging optical system 5 such as a lens and so on, a photodetector element (CCD image sensor) 6 being a photoelectric conversion means, and a signal processing block 7, which are provided in a case 1 in a shape with a bent at a tip portion having an opening.

The LED 2 is located at a position close to the tip opening portion of the case 1 and directly projects light to a bar code symbol 201 having portions with different light reflectances of an object to be read 200. The reflector 3 is located near the bent portion in the case 1 and receives and deflects reflected light from the bar code symbol 201, the reflected light being made of the light projected by the LED 2, to make the deflected light incident on the imaging optical system 5 through the slit 4. The imaging optical system 5 forms an image of the bar code symbol 201 on a light receiving surface of the photodetector element 6. The photodetector element 6 composed of the CCD image sensor converts the gradation of the image into an electric signal and inputs the signal into the signal processing block 7.

The signal processing block 7, which is composed of an analog processing block 7a and a digital processing block 7b, performs analog and digital processing of the electric signal photoelectrically converted by the photodetector element 6, recognizes the bar code symbol, and transmits its code data to the host apparatus.

Unlike the above-described conventional signal processing block, the signal processing block 7 of this optical information reading apparatus is characterized in that an amplification circuit for amplifying the electric signal photoelectrically converted by the photodetector element 6 and a part of an A/D converter for converting the analog electric signal into a digital signal are configured as the analog processing block 7a, and processing circuits such as the other portion of the A/D converter, a binarization unit, a decoder, and an interface are configured as the digital processing block 7b through use of a multipurpose processing circuit formed on a single substrate.

The single substrate may be a substrate of a printed circuit board or a semiconductor substrate on which a semiconductor integrated circuit (IC or LSI) is formed.

Figure 2:
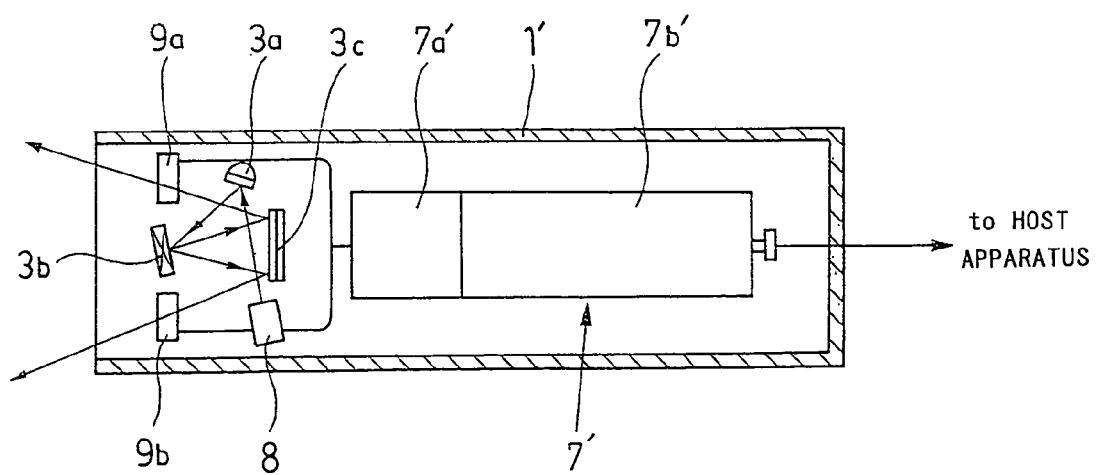
FIG. 2 is a schematic sectional plan view showing an example of an optical information reading apparatus according to the invention using a laser light source as a light emitting block.

FIG. 2 is a schematic sectional plan view showing another example of the optical information reading apparatus according to the invention, in which a laser light source is used as a light source of a light emitting block being a light projection means. This optical information reading apparatus also includes a laser light source 8 for projecting a laser beam by light emission of a semiconductor laser through a collimate lens or a slit, a reflector 3a, a swinging reflector 3b, a return reflector 3c, and light receiving units 9a and 9b including photodetector elements, which are provided near a tip portion in a case 1' in a shape with a bent at the tip portion, similarly to the case 1 shown in FIG. 1 as seen form the side, and includes a signal processing block 7' which is provided behind those components in the case 1'.

The laser beam projected from the laser light source 8 is reflected by the reflector 3a to the swinging mirror 3b so that the laser beam is scanned by swing of the swinging mirror 3b to scan a bar code symbol of a not-shown object to be read via the return mirror 3c. The light receiving units 9a and 9b receive and photoelectrically convert reflected light from the bar code symbol, and input a resulting electric analog signal into the signal processing block 7'.

The signal processing block 7', which is composed of, similarly to the signal processing block 7 shown in FIG. 1, an analog processing block 7a' and a digital processing block 7b', performs analog and digital processing of the electric signal photoelectrically converted by photodetector elements 6, recognizes the bar code symbol, and transmits its code information to a host apparatus such as a microcomputer or the like.

The configurations and functions of the analog processing block 7a' and the digital processing block 7b' are the same as those of the analog processing block 7a and the digital processing block 7b of the signal processing block 7 shown in FIG. 1.

Figure 3:
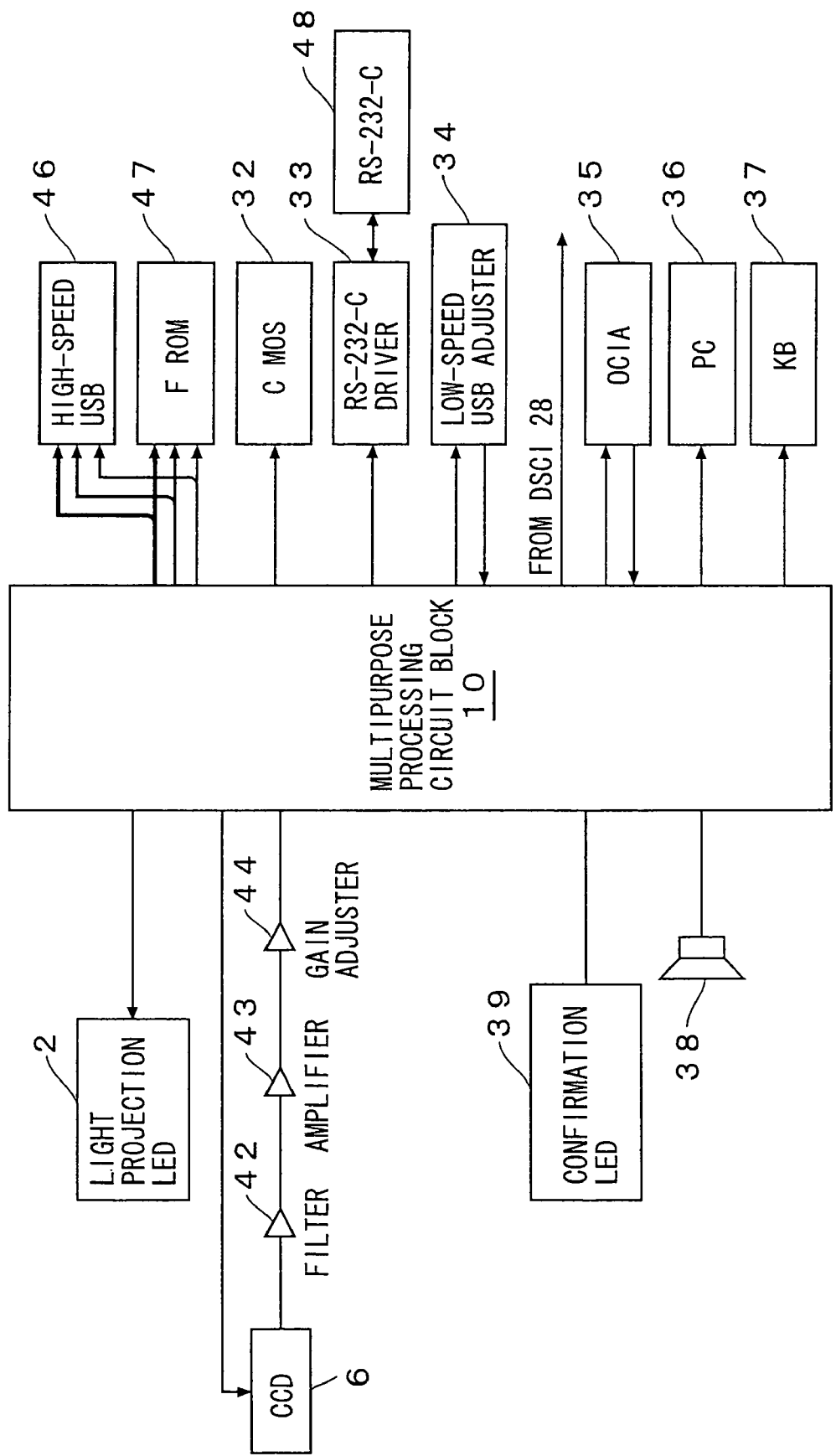
FIG. 3 is a block diagram showing an example of an entire configuration of a signal processing block in the optical information reading apparatus shown in FIG. 1 according to the invention.
Figure 4:
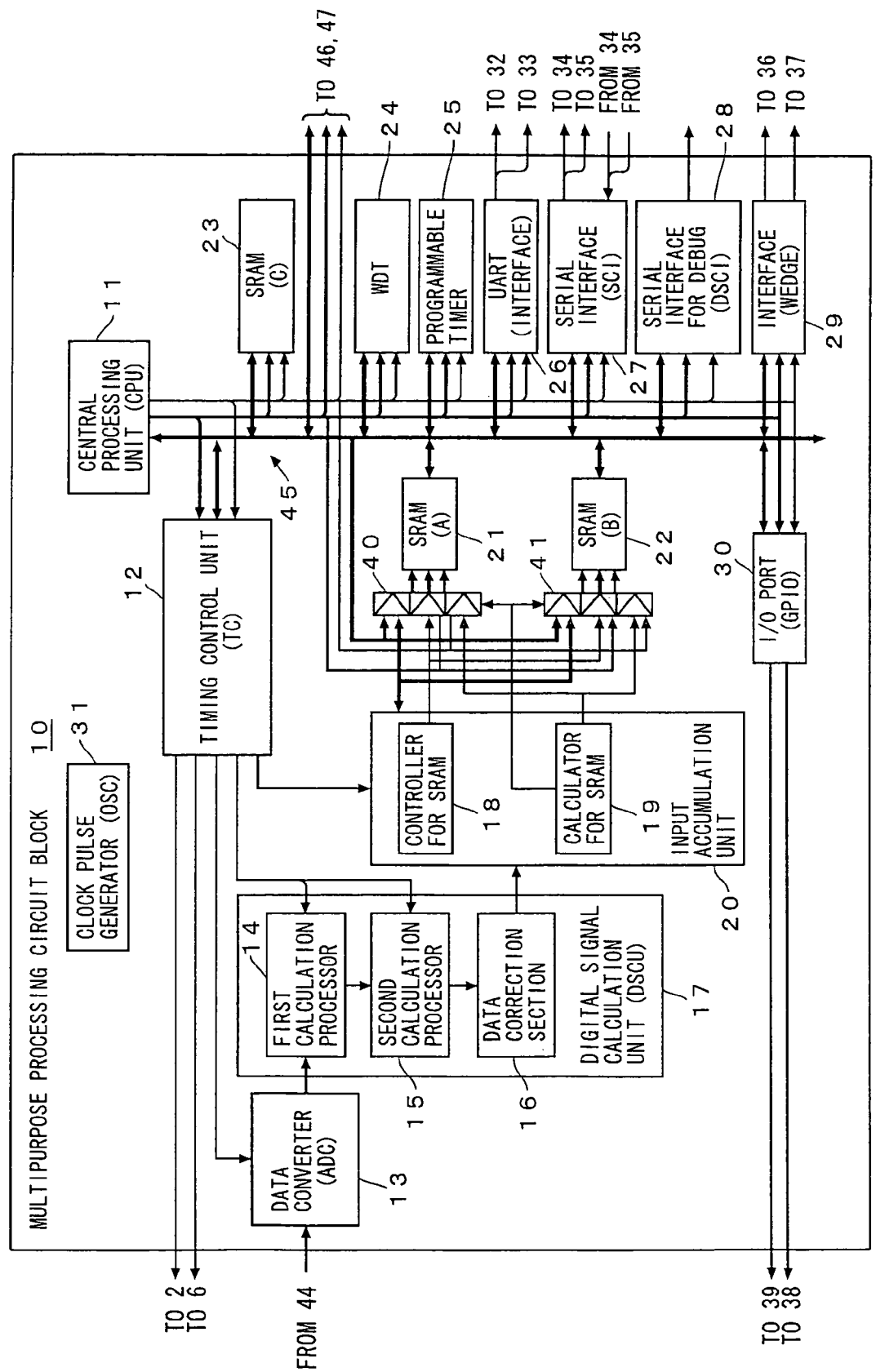
FIG. 4 is a block diagram showing an internal configuration of a multipurpose processing circuit block in FIG. 3.

FIG. 3 is a block diagram showing an example of an entire configuration of the signal processing block in the optical information reading apparatus shown in FIG. 1 according to the invention, and FIG. 4 is a block diagram showing an internal configuration of a multipurpose processing circuit block thereof. In a multipurpose processing circuit block 10, respective components explained below are integrally provided on a single substrate to form a single printed circuit board or semiconductor integrated circuit.

The configuration of the multipurpose processing circuit block 10 shown in FIG. 4 is explained first. The multipurpose processing circuit block 10 is composed of a central processing unit (CPU) 11 as a center, a timing control unit 12, a data converter (ADC) 13 composed of an A/D conversion circuit, a digital signal calculation unit (DSCU) 17, an input accumulation unit 20, an SRAM(A) 21 and an SRAM(B) 22, an SRAM(C) 23 for operation of the CPU 11, and a watchdog timer (WDT) 24 for inputting/outputting and managing respective characteristics and data, a programmable timer 25 for monitoring operation of each function in terms of time and issuing a command, a UART (asynchronous serial communication transmitter/receiver circuit) 26 being an interface, a serial interface (SCI) 27, a serial interface for debug (DSCI) 28, an interface (WEDGE) 29, a general-purpose I/O port (GPIO) 30, a clock pulse generator (OSC) 31, and buffer groups 40 and 41, which are connected to the CPU 11. These circuits are integrally formed on a single substrate.

The digital signal calculation unit (DSCU) 17 comprises a first calculation processor 14 that is, for example, an integration circuit, a second calculation processor 15 that comprises, for example, a differentiation circuit and a binarization circuit, and a data correction section 16. The input accumulation unit 20 comprises a controller for SRAM 18 and a calculator for SRAM 19.

To the multipurpose processing circuit block 10, various external circuits and so on are connected as shown in FIG. 3. Referring to FIG. 3 and FIG. 4, the timing control unit 12 controls the LED 2 for projecting light and the CCD image sensor 6, so that an analog electric signal photoelectrically converted by the CCD image sensor 6 is inputted into the data converter 13 via a filter 42, an amplifier 43, and a gain adjuster 44.

To the general-purpose I/O port (GPIO) 30, a buzzer 38 and a confirmation LED 39 are connected.

To the central processing unit 11 shown in FIG. 4, the timing control unit 12, the buffer groups 40 and 41, the SRAMs 21, 22, and 23, the watchdog timer (WDT) 24, the programmable timer 25, the interfaces 26 to 29, and the I/O port (GPIO) 30, which are internal components, are connected via a CPU bus 45 composed of data buses, address buses, and control buses respectively shown by thick lines, medium lines and thin lines, and a FROM 47 and a high-speed USB (universal system bus) 46, which are external parts, are also connected.

Further, a CMOS 32 and an RS-232-C driver 33 for driving an RS-232-C 48 are connected to the UART 26 being an interface, a low-speed USB adjuster 34 and an OCIA (optical coupled interface adopter) 35 are connected to the serial interface (SCI) 27, and a personal computer (PC) 36 and a keyboard (KB) 37 are connected to the interface (WEDGE) 29.

Next, the details of the respective components constituting the multipurpose processing circuit block 10 shown in FIG. 4 will be explained.

The central processing unit CPU 11 is a Z80 binary compatible fast CPU and is designed such that its bus cycle is changed from 4 clocks to 2 clocks for an increase in speed and its operating frequency is also increased, so that the CPU 11 operates at up to a maximum frequency of 25 MHz.

The timing control unit 12 is a timing generator for conducting timing control of the light projection LED 2 and the CCD image sensor 6 which are shown in FIG. 3, the data converter (ADC) 13 for converting an analog signal from the CCD image sensor 6 into a digital signal, the first calculation processor 14 and the second calculation processor 15 for calculating the signal from the data converter 13, the input accumulation unit 20, and so on. It should be noted that, in the optical information reading apparatus using laser light, a timing control unit for controlling operations of the swinging mirror for scanning the laser light, an A/D converter, a calculation unit for processing a signal from the A/D converter, an input accumulation unit, and so on corresponds to the timing control unit 12.

The component that is the heart of the multipurpose processing circuit block 10 and the most characteristic is the digital signal calculation unit (hereafter, called a "DSCU")

17 composed of the first calculation processor 14, the second calculation processor 15, and the data correction section 16.

The DSCU 17 is a portion that generates bar code binarized data from the bar code data which has been A/D converted by the data converter 13, and an example thereof using an integration circuit as the first calculation processor 14 and a differentiation circuit as the second calculation processor 15 is explained here. As the DSCU 17, however, various circuits such as a moving average circuit, a circuit for generating bar code binarized data from bar code data by an FIR (finite impulse response) digital filter or an IIR (infinite impulse response) digital filter, and so on can be arbitrarily selected for use, in accordance with the degree of variations in processing performance of the optical information reading apparatus, the processing speed, the need for a reduction in power consumption and so on, and the purpose.

In the DSCU 17, the first calculation processor 14 integrates data which has been produced by A/D converting an output signal of the CCD image sensor 6 by the data converter 13, and the second calculation processor differentiates the integrated data to obtain a difference and compares the difference with a predetermined slice level to generate bar code binarized data. Further, the data correction section 16 corrects the generated bar code binarized data and takes measures against noise, and then outputs the corrected bar code binarized data to the input accumulation unit 20.

The details of the DSCU 17 will be explained later.

The input accumulation unit (input capture) 20, which has a function of inputting a bar code binarized data signal from the DSCU 17 thereinto and stores it, comprises the controller for SRAM 18 for controlling addresses of the SRAMs and a timing generator for writing calculated data into the SRAMs, that is, the calculator for SRAM 19, captures data which has been corrected at regular time intervals by the data correction unit 16 of the DSCU 17, and automatically expands the corrected data in each memory.

The data capturing memories are the SRAM(A) 21 and the SRAM(B) 22 which are alternately used during capture operation. The CPU 11 cannot get access to the memory in capture operation. Accordingly, during operation of capturing into the SRAM 22, the CPU 11 cannot get access to the SRAM 22 but can freely get access to the SRAM 21 which is not in capture operation. The SRAM 21 and the SRAM 22 are areas where the bar code binarized data is stored.

The SRAM(C) 23 is used for operation of the central processing unit CPU 11. Addresses are about 4 K bytes from D000h to DFFFh.

The watchdog timer (WDT) 24, which is a timer monitoring abnormal values in terms of time, inputs/outputs respective characteristics and data and manages abnormal values when inputting/outputting.

The programmable timer 25 comprises a 16-bit timer in which a frequency can be set and an 8-bit timer for buzzer in which a frequency and a duty can be set.

The UART (asynchronous serial communication transmitter/receiver circuit) 26, which is an interface to the CMOS 32 and the RS-232-C driver 33 shown in FIG. 3, is a 16550 compatible UART.

The serial interface (SCI) 27, which is an interface to the low-speed USB adjuster 34 and the OCIA (optical coupled interface adopter) 35, is a three wire-type synchronous serial communication interface. The serial interface (SCI) 27 is used for connecting with the low-speed USB adjuster 34, which is composed of, for example, a USB function controller (UPD789800) manufactured by NEC, and the OCIA 35.

The serial interface for debug (DSCI) 28, which is a controller for debugging, outputs in serial calculation results of the digital signal calculation unit (DSCU) 17 or data in synchronism therewith inside the multipurpose processing circuit block 10. The output data is converted into an analog signal by an external D/A conversion circuit to be used to observe at an external part the slice state of the DSCU 17 inside the multipurpose processing circuit block 10.

The interface (WEDGE) 29 is an interface for connecting with the external PC (personal computer) 36 and KB (keyboard) 37 shown in FIG. 3.

The I/O port (GPIO) 30 is a general-purpose I/O port for connecting with the buzzer 38 and confirmation LED 39 shown in FIG. 3.

The details of the digital signal calculation unit (DSCU) 17 inside the multipurpose processing circuit block 10 shown in FIG. 4 will be explained here with FIG. 5 to FIG. 10.

Figure 5:
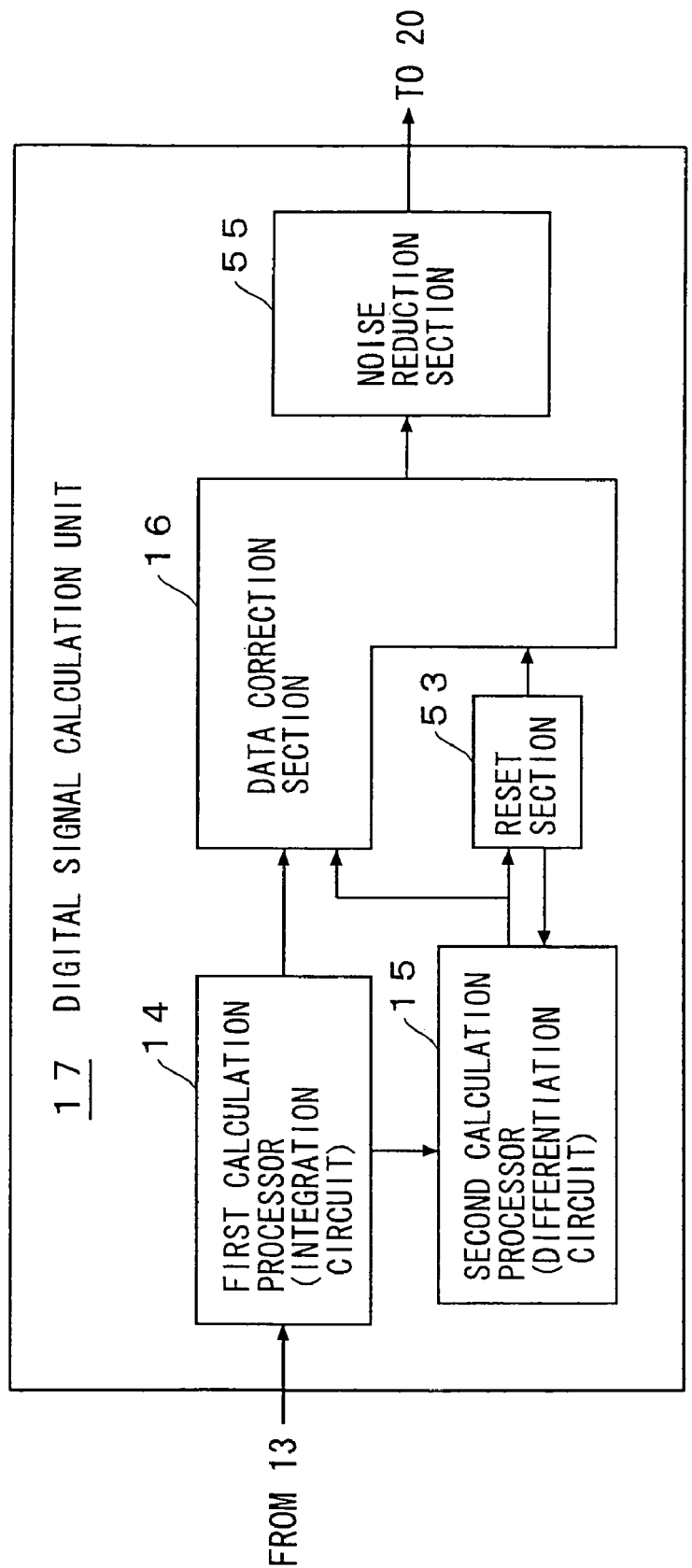
FIG. 5 is a block diagram showing a configuration example of a digital signal calculation unit (DSCU) in FIG. 4.

First, an example of the entire configuration of the DSCU 17 is shown in FIG. 5. The DSCU 17 includes, as main components, a reset section 53 and a noise reduction section 55 which are not shown in FIG. 4, in addition to the first calculation processor 14, the second calculation processor 15, and the data correction section 16 which are shown also in FIG. 4.

Next, specific configuration examples of the respective components will be explained with FIG. 6 to FIG. 10.

The first calculation processor 14, which forms an integration circuit as shown in FIG. 6, inputs thereinto digital data sent from the data converter 13 and sends the data by a shift register 58 to level buffers 59 and 59' for setting a level and to an offset buffer 60 for giving an offset. The data passing through the level buffers 59 and 59' are integrated by an integrator 63. On the other hand, the data sent to the offset buffer 60 further passes through a shift register 61, level buffers 62 and 62' and integrated by an integrator 64. The data integrated by the integrators 63 and 64 are outputted to a later-described differentiator 65 of the second calculation processor 15.

The first calculation processor 14 also includes a data P—P detection section 56. A data P—P detector 75 of the data P—P detection section 56 detects a peak-to-peak value of the data from the shift register 58 and sends resulting data to a comparator 76, which compares the data with data of an analog level at the time of generating the bar code binarized data to generate an FF reset signal and sends the signal to a later-described plurality of mask selection sections of the data correction section 16.

The second calculation processor 15 forms a differentiation circuit as shown in FIG. 7. The integrated data from the respective integrators 63 and 64 of the first calculation processor 14 are inputted into the differentiator 65 and differentiated. A peak detector 66 detects a peak value of resulting differentiated data and sends the result to an FF (flip-flop circuit) 68.

Meanwhile, the differentiated data from the differentiator 65 is captured into a comparator 67. The comparator 67 compares the differentiated data with a signal at a high slice level and a signal at a low slice level, and outputs the comparison result to the FF 68.

The FF 68 generates bar code binarized data from the comparison result from the comparator 67 and the data of the peak value from the peak detector 66, and output the bar code binarized data to the reset section 53 and a later-described counter 73 of the data correction section 16.

The reset section 53, which comprises a counter 71 and a comparator 72 as shown in FIG. 8, estimates a state in which the bar code binarized data inputted from the FF 68 keeps a high level "H", and forcibly changes (resets) the data to a low level "L" when the state continues for more than a set period, to return the data to the FF 68 of the second calculation processor 15. When the state does not continue for more than the set period, the reset section 53 sends the bar code binarized data to a later-described FF 78 of the data correction section 16.

Figure 9:
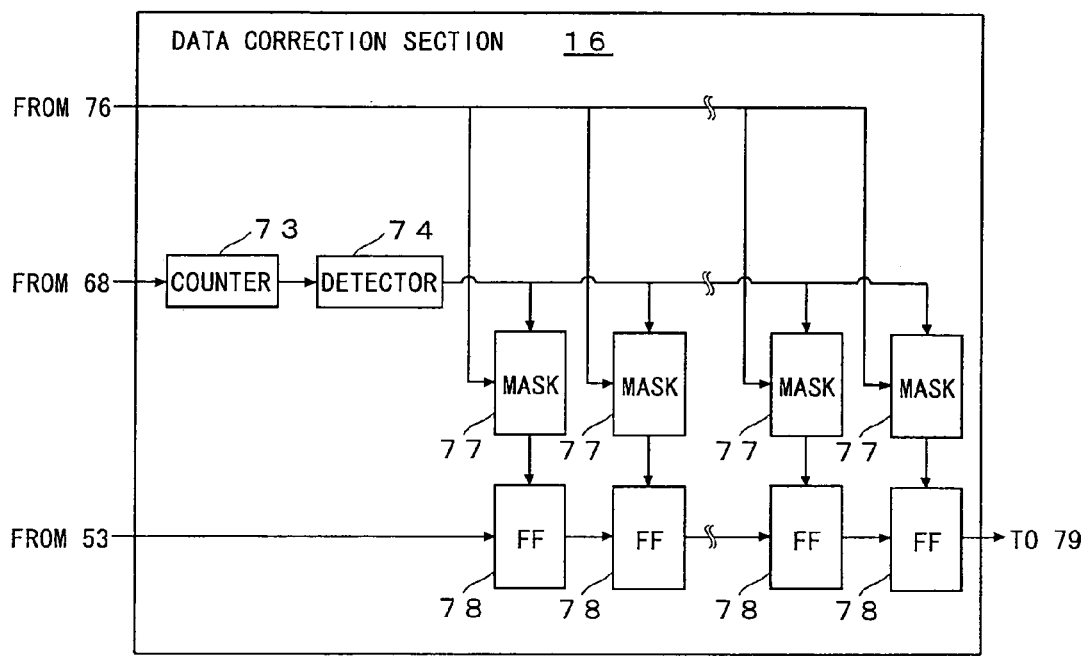
FIG. 9 is a block diagram showing a specific configuration example of a data correction section in FIG. 5.

The data correction section 16, which is composed as shown in FIG. 9, captures the bar code binarized data from the FF 68 of the second calculation processor 15 into a detector 74 via the counter 73, captures the FF reset signal from the data P—P detection section 56 of the first calculation processor 14, and passes both the data and the signal through a plurality of masks 77 and a plurality of FFs 78, so as to correct, to a low level, data at a high level of a portion of the bar code binarized data which has been generated in a state of the analog level being below a preset value. The bar code binarized data thus corrected in the data correction section 16 is sent to the subsequent noise reduction section 55.

Figure 10:
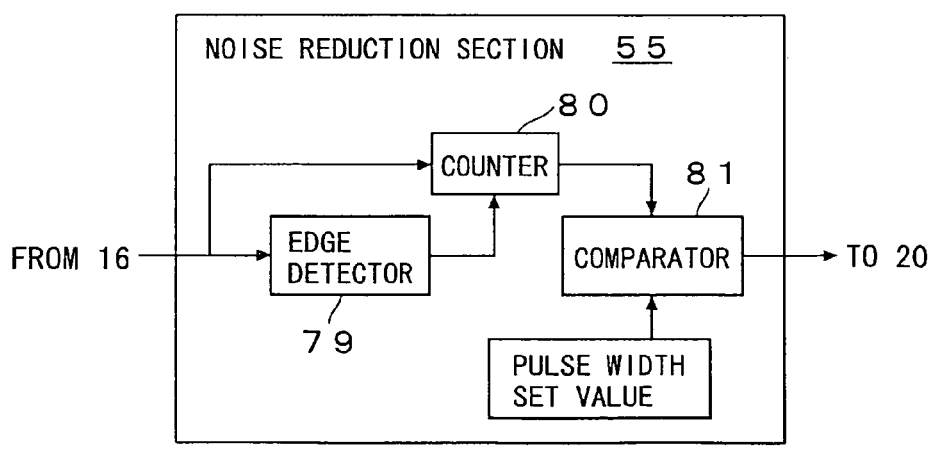
FIG. 10 is a block diagram showing a specific configuration example of a noise reduction section in FIG. 5.

The noise reduction section 55 comprises an edge detector 79, a counter 80, and a comparator 81 as shown in FIG. 10. The edge detector 79 detects the pulse width of the bar code binarized data sent from the data correction section 16 and sends it to the counter 80. Then, the comparator 81 compares a count data value of the counter 80 with a pulse width set value which has been preset in advance and erases data with a pulse width of the set value or less. Corrected bar code binarized data thus corrected is sent to the input accumulation unit 20 shown in FIG. 4.

Next, another configuration example of the digital signal calculation unit will be described with FIG. 11. Portions in FIG. 11 corresponding to those shown in FIG. 5 to FIG. 10 are assigned the same symbols and numerals. Further, the illustration of many of the common portions is omitted or simplified.

Figure 11:
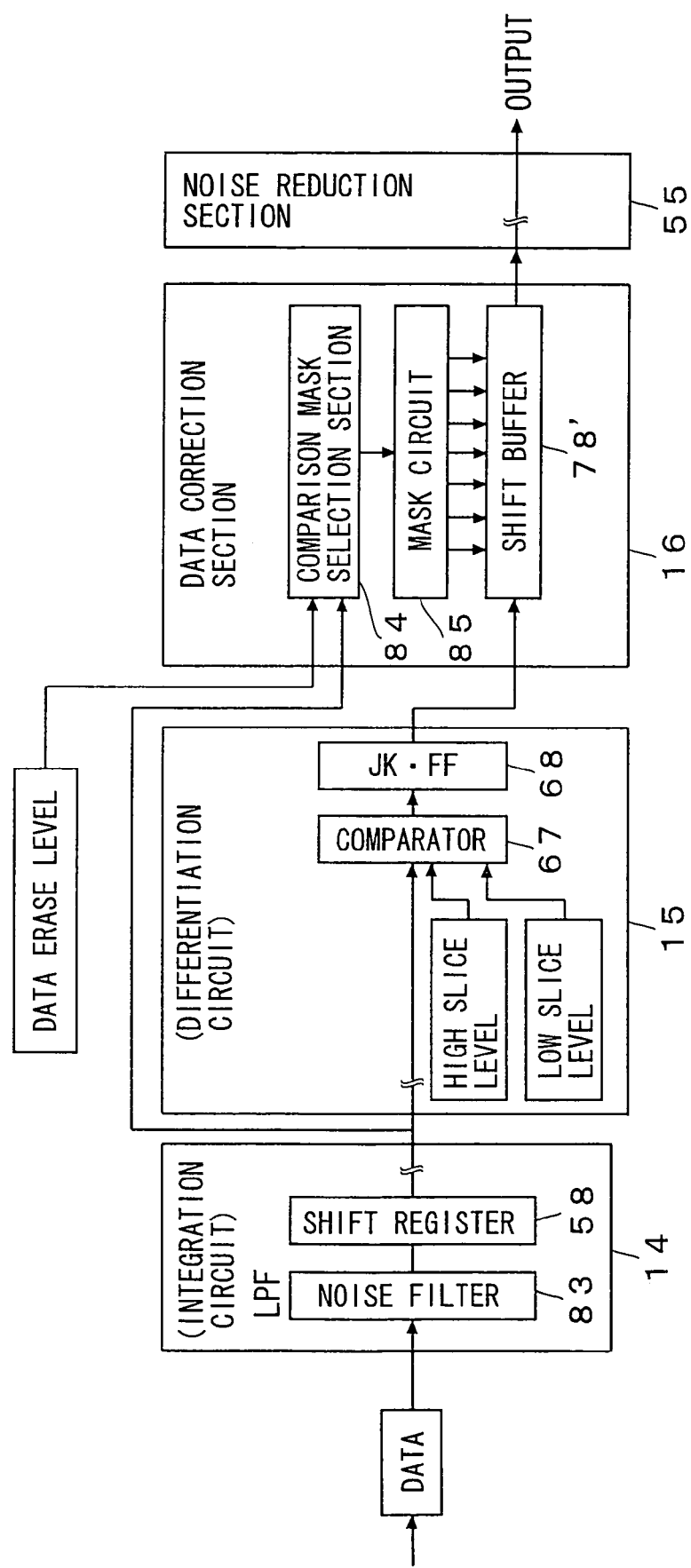
FIG. 11 is a block diagram showing another configuration example of the digital signal calculation unit (DSCU) in FIG. 4.

The digital signal calculation unit shown in FIG. 11 comprises a first calculation processor 14 using an integration circuit, a second calculation processor 15 using a differentiation circuit, a data correction section 16, and a noise reduction section 55.

The first calculation processor 14 includes a noise filter 83 and a shift register 58 in addition to the respective portions shown in FIG. 6, and eliminates an AC component from the input data from the data converter 13 in FIG. 4 to leave only the gradient of the edge of the signal and sends resulting data to the second calculation processor 15 and the data correction section 16.

The second calculation processor 15 composed of the differentiation circuit includes a comparator 67 and a JK-FF 68, and outputs data made by inverting the data generated by the first calculation processor 14 at a point where the data intersects an upper limit or a lower limit. The data becomes bar code binarized data.

More specifically, the comparator 67 compares the data from the first calculation processor 14 with a high slice level being the upper limit value and a low slice level being the lower limit value, and, in accordance with the comparison result, the JK-FF 68 inverts the bar code binarized data signal in such a manner that the signal changes to the high level when the data comes to have the upper limit value or higher and to the low level when the data comes to have the lower limit value or lower. Between the high slice level and the low slice level, hysteresis is provided to keep the preceding state.

Figure 12:
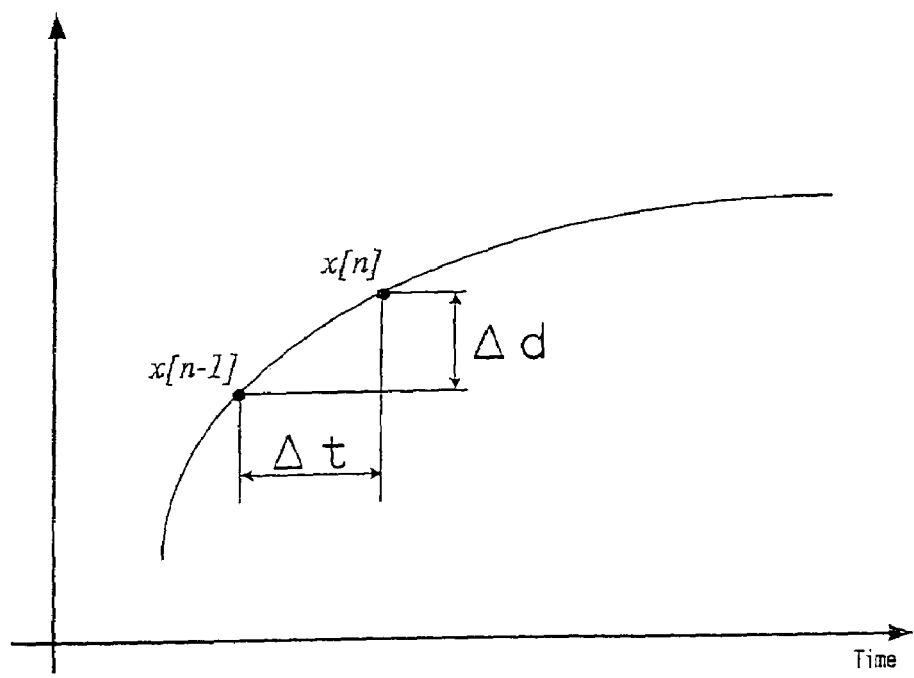
FIG. 12 is a diagram for explaining a differential expression.

A differential expression at this time is expressed by the following expression using $\Delta t$, $\Delta d$, $X_n$, and $X_{n-1}$ shown in FIG. 12.

$$\Delta d/\Delta t = (X_n - X_{n-1})/\{n-(n-1)\}$$

Besides, basic configurations of a sampling circuit and a differentiation circuit at this time are the same as those of the first calculation processor 14 and the second calculation processor 15 shown in FIG. 6 and FIG. 7, but these configurations tend to pick up noise of data. Therefore, it was shown that the decoding ability significantly improves when the following functions were added to the configurations:

① a function of varying the differential time ($\Delta t$) in the differentiation circuit of the second calculation processor 15;

② a function of eliminating or reducing noise;

③ a function of minimizing the difference in total data due to buffer selection;

④ a function of eliminating noise components by comparison with an analog signal;

⑤ a function of erasing binary data with an arbitrary pulse width or less; and

⑥ a function of forcibly resetting binary data at a high level continuing for a predetermined length or longer.

Next, these six functions will be explained.

As for the function ① of varying the differential time ($\Delta t$), in order to provide frequency characteristics corresponding to the input data to the first calculation processor 14, buffers respectively structured in two stages are provided between the first calculation processor 14 and the second calculation processor 15 so that the time ($\Delta t$) required for passing data from the front stage to the rear stage can be selected.

Figure 13:
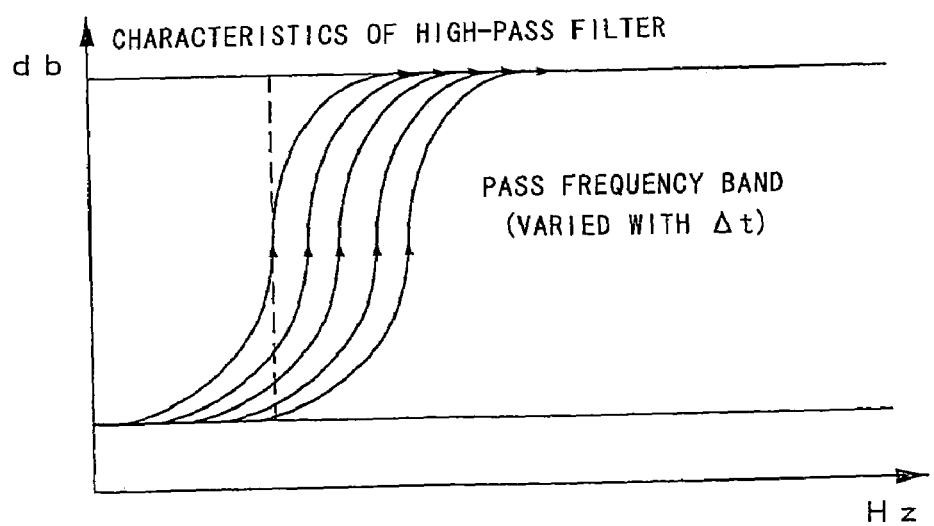
FIG. 13 is a diagram showing characteristics of a high-pass filter.

As a result, the whole filter characteristics become a combination of the characteristics of a low-pass filter of the noise filter 83 and the characteristics of a high-pass filter by the variability of the aforementioned differential time ($\Delta t$), and thus serves as a function of a band-pass filter. The characteristics of the high-pass filter are as shown in FIG. 13 in which the pass frequency band varies with $\Delta t$.

As for the function ② of coping with noise, since noise with a large gradient may be an object to be detected by the differentiation circuit of the second calculation processor 15, a low-pass filter as the noise filter 83 in FIG. 11 is provided at a position preceding the shift register 58.

Figure 14:
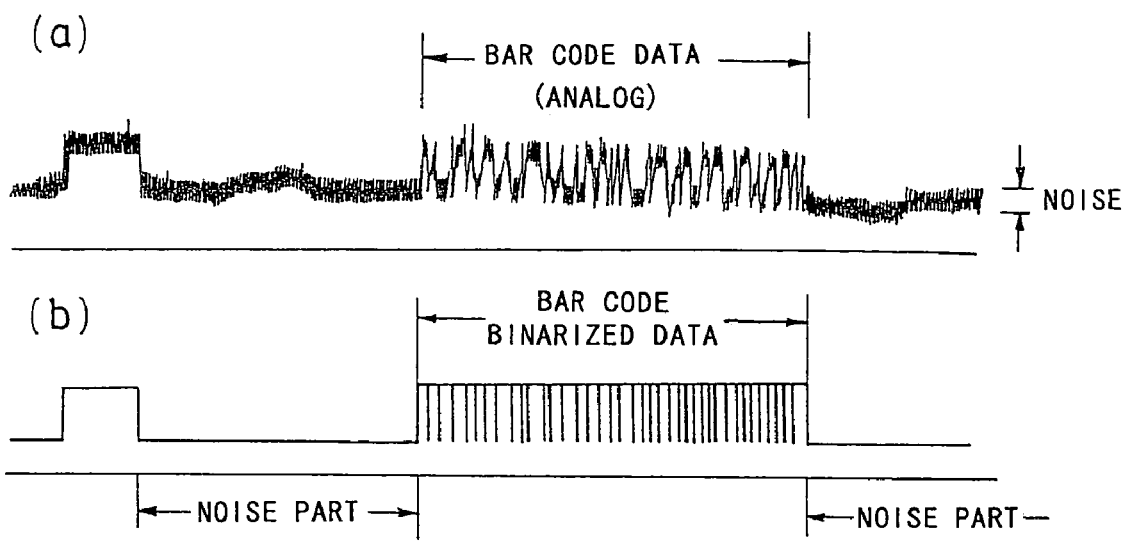
FIG. 14 is a waveform chart showing analog bar code data when a low-pass filter is provided as a noise filter in FIG. 11, and binarized data thereof.

As a result, while noise appears in the analog state of data as shown in a part (a) of FIG. 14, no noise part appears at all in the bar code binarized data as shown in a part (b) of FIG. 14, which shows that no influence of analog noise is exerted on the bar code binarized data.

Figure 15:
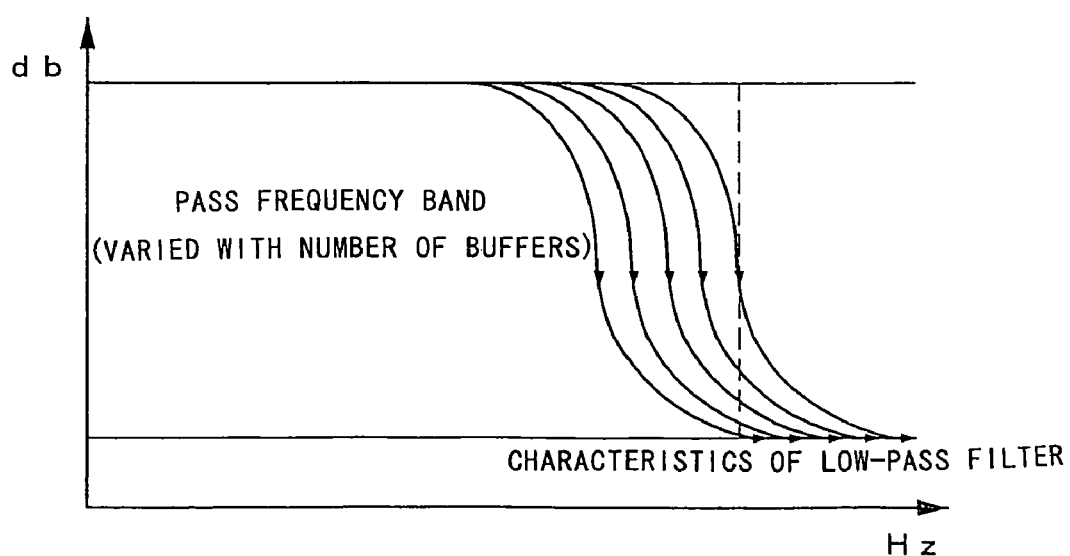
FIG. 15 is a diagram showing characteristics of the same low-pass filter.

The characteristics of the noise filter 83 at this time are as shown in FIG. 15 in which the pass frequency band varies with the number of buffers constituting the noise filter. The gradient of the input waveform decreases, but this decrease can be coped with by a function of adjusting duration. As described above, it is possible to cope with various noises by making variable the frequency characteristics of the noise filter 83 in FIG. 11.

Figure 16:
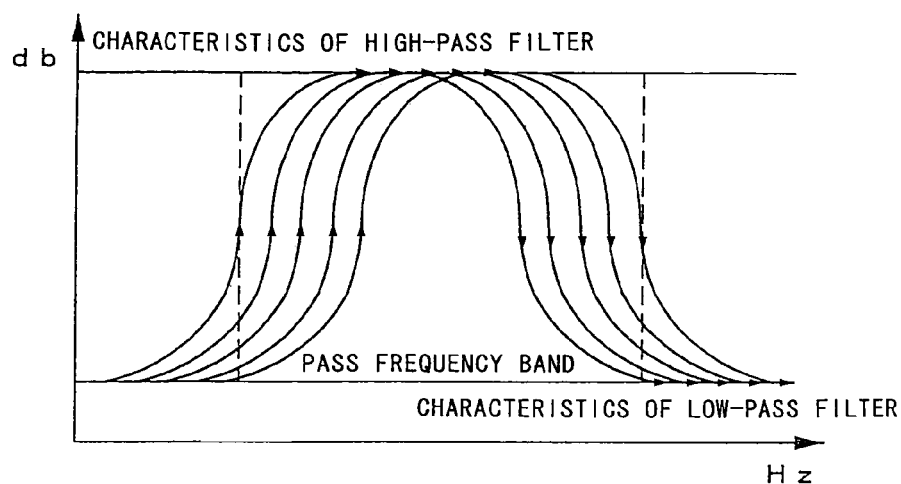
FIG. 16 is a diagram showing characteristics obtained by combining the characteristics of the high-pass filter in FIG; 13 and the characteristics of the low-pass filter in FIG. 15.

Consequently, the characteristics of the high-pass filter of the foregoing ① (FIG. 13) and the characteristics of the low-pass filter of ② (FIG. 15) are combined to provide characteristics of a band-pass filter having variable pass frequency bands as shown in FIG. 16.

As for the function ③ of minimizing the difference in total data due to buffer selection, the low-pass filter section of the above-described ② calculates the total data by an expression for a total as follows:

$$G(n) = \Sigma(n-k)$$

In this case, the total value tends to vary due to the coefficient k, and this state also affects the value of the differentiation (by the differentiator 65 in FIG. 7), so that the high slice level and the low slice level in the second calculation processor 15 in FIG. 11 should be substantially changed every time the coefficient is changed. Hence, with respect to this coefficient, the total data is multiplied by n. The reference at this time is the bit width of a maximum total number.

Figure 17:
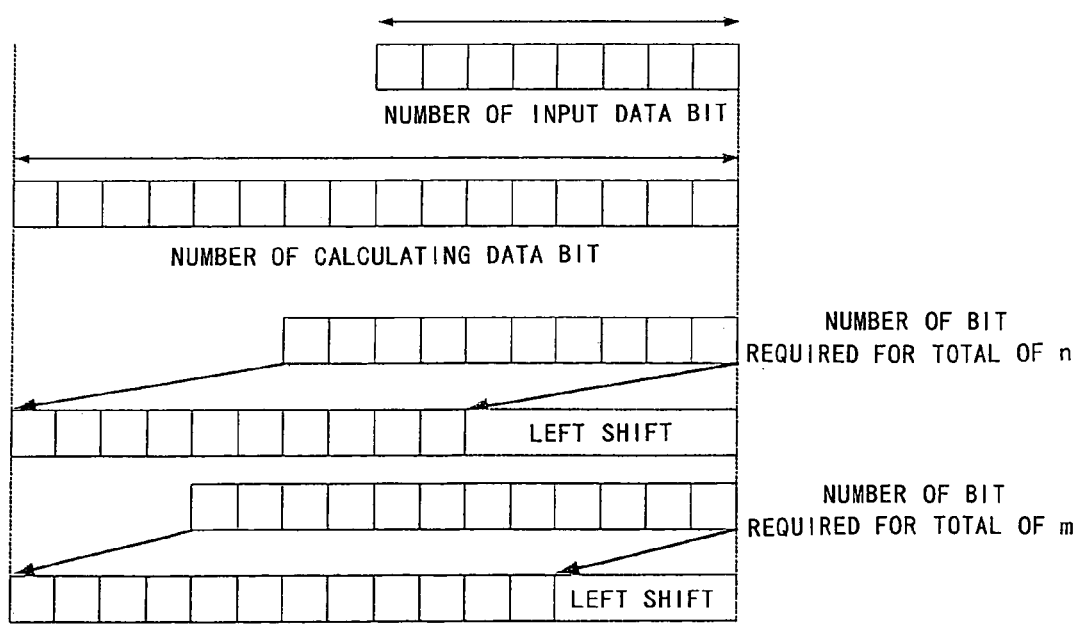
FIG. 17 is a conceptual diagram of low-pass output adjustment in the low-pass filter section.

This configuration decreases the difference in the total output value with respect to the coefficient and eliminates the necessity of changing the slice levels. The adjustment of the low-pass output at this time is implemented by shift to the left as shown in FIG. 17.

As for eliminating or reducing noise ④ by comparison with an analog signal, since noise which cannot be eliminated by a band-pass filter (pass band limit filter) often remains in the waveform of the bar code binarized data, a function of eliminating a data waveform at a low input data level is necessary. Therefore, as in the data correction section 16 shown in FIG. 11, in a comparison mask selection section 84 selects the data from the first calculation processor 14 and a data erase level from an external part, and a mask circuit 85 masks and sends them to a shift buffer 78' (corresponding to a circuit constituted by the FFs 78 in FIG. 9 connected in multiple stages).

Figure 18:
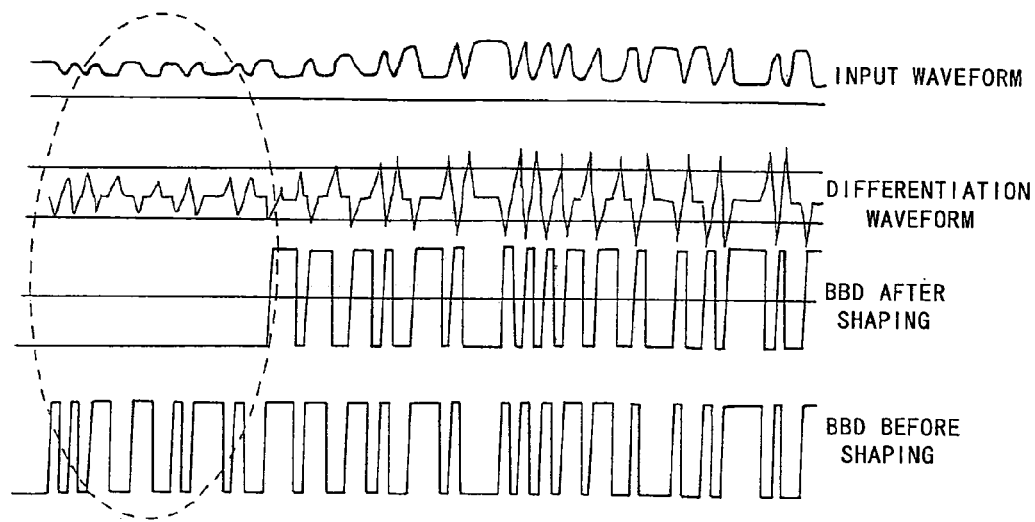
FIG. 18 is a waveform chart showing a correction example of bar code binarized data by a data correction section in FIG. 11.

Here, a portion with bar code binarized data at a high level but an input data level at a low level (as compared with set values) is judged to be noise, so that the waveform of the bar code binarized data is brought to a low level. The diagram of a waveform forming the bar code binarized data by comparison with the analog input data is as shown in FIG. 18. More specifically, the bar code binarized data (abbreviated as BBD in FIG. 18) is shaped, as it is, results in the fourth waveform (BBD before shaping). In contrast to this waveform, when the level of the input data is compared so that data at a level below a fixed level is erased, the bar code binarized data results in the third waveform.

As for the function ⑤ of erasing binary data with an arbitrary pulse width or less is implemented by the configuration of the noise reduction section 55 shown in FIG. 10. Here, since noise at a high input level is outputted to the bar code binarized data, the comparator 81 has a function of erasing, based on an arbitrary pulse width set value, data with the set pulse width or less.

Figure 19:
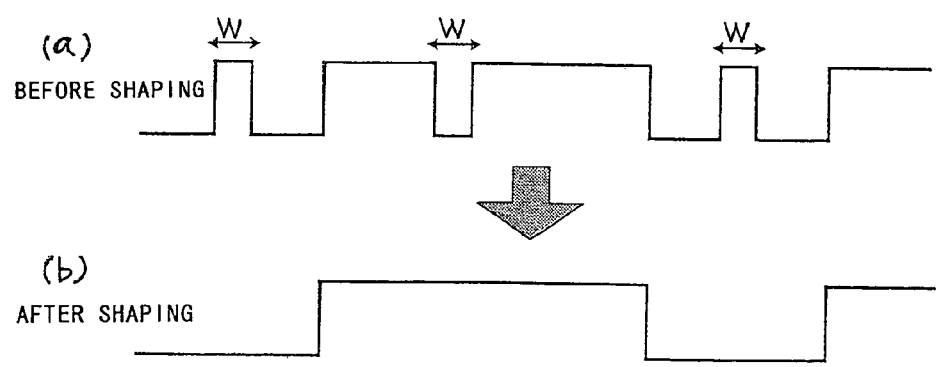
FIG. 19 is a waveform chart showing a noise elimination example by the noise reduction section shown in FIG. 10.

Further, the bar code binarized data with the set pulse width or less is kept at a level before change, whereby most of fine noises that will be captured when a thick bar code or the like is read can be eliminated. This is illustrated as shown in FIGS. 19A and 19B. A part (a) of FIG. 19 shows a waveform of the bar code binarized data before shaping. In contrast to this, when data with a set pulse width W or less is not counted, the waveform becomes a waveforms after shaping shown in a Part (b) of FIG. 19.

Next, as for the function ⑥ of forcibly resetting data keeping a state of a high level "H" continuing for a predetermined length or longer, this function is implemented by the reset section 53 shown in FIG. 8. A differentiation circuit has a characteristic that noise having a steep gradient becomes high in output data level. When the noise reaches the high slice level (upper limit threshold) shown in FIG. 7, a bar code binarized data waveform turns to the high level and never returns to the preceding level until the noise drops to the low slice level (lower limit threshold). However, the gradient is not enough to drop down below the low slice level because it is noise, the high level is kept until a data portion.

Figure 20:
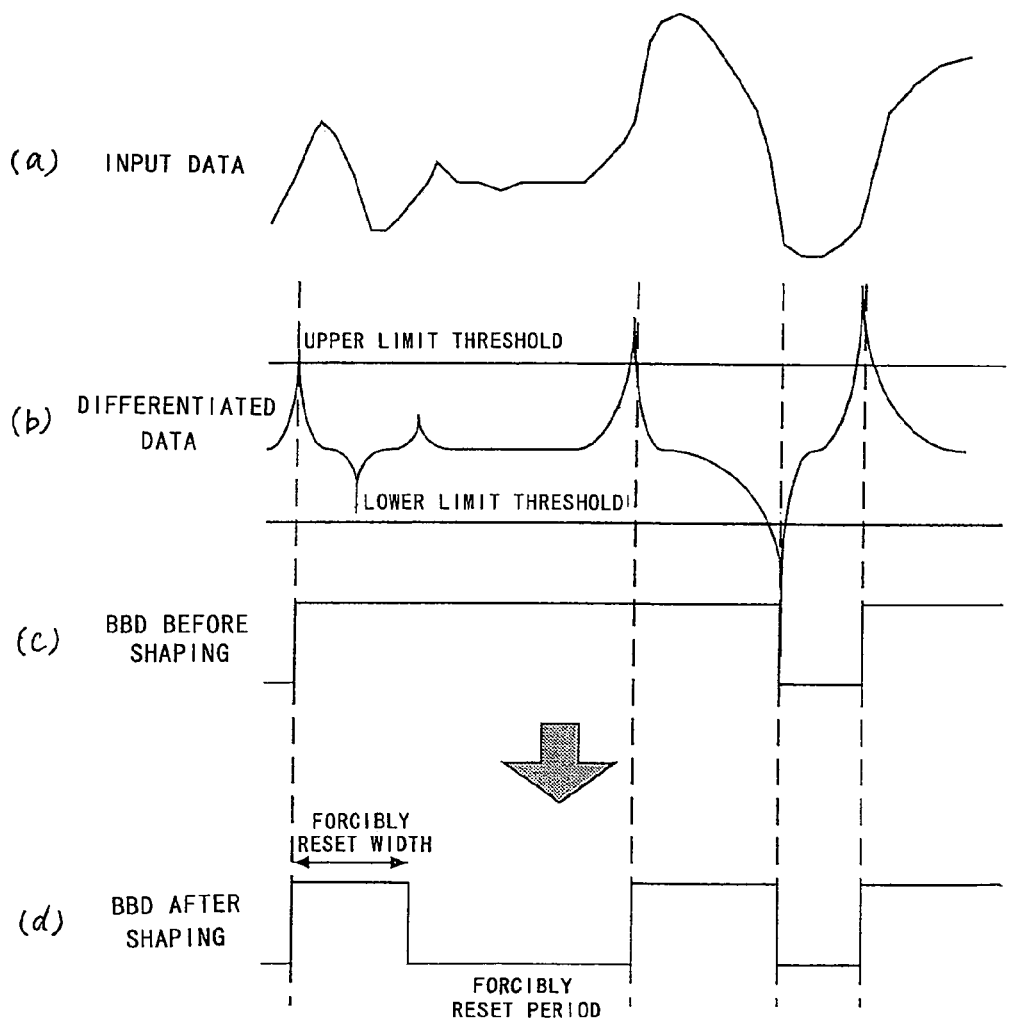
FIG. 20 is a waveform chart showing an example of forcible reset of bar code binarized data by the reset section shown in FIG. 8.

Hence, a function of forcibly dropping to the low level after a lapse of a fixed period is added. This eliminates the influence of noise on the detection data by the detector 74 of the data correction section 16 shown in FIG. 9. The above is as shown in FIG. 20. In FIG. 20, a part (a) shows a waveform of the input data containing noise components, a part (b) shows the relationship between a waveform of differentiated data of the input data and the high slice level (upper limit threshold) and low slice level (lower limit threshold), a part (c) shows a waveform of the bar code binarized data (BBD) before shaping, and a part (d) shows a waveform of the bar code binarized data (BBD) after shaping.

Next, an embodiment using a moving average circuit as the first calculation processor 14 in FIG. 5 will be explained.

The moving average circuit basically has a function of a low-pass filter and thus has a characteristic of eliminating noise such as small frequency components to smooth a waveform.

Figure 21:
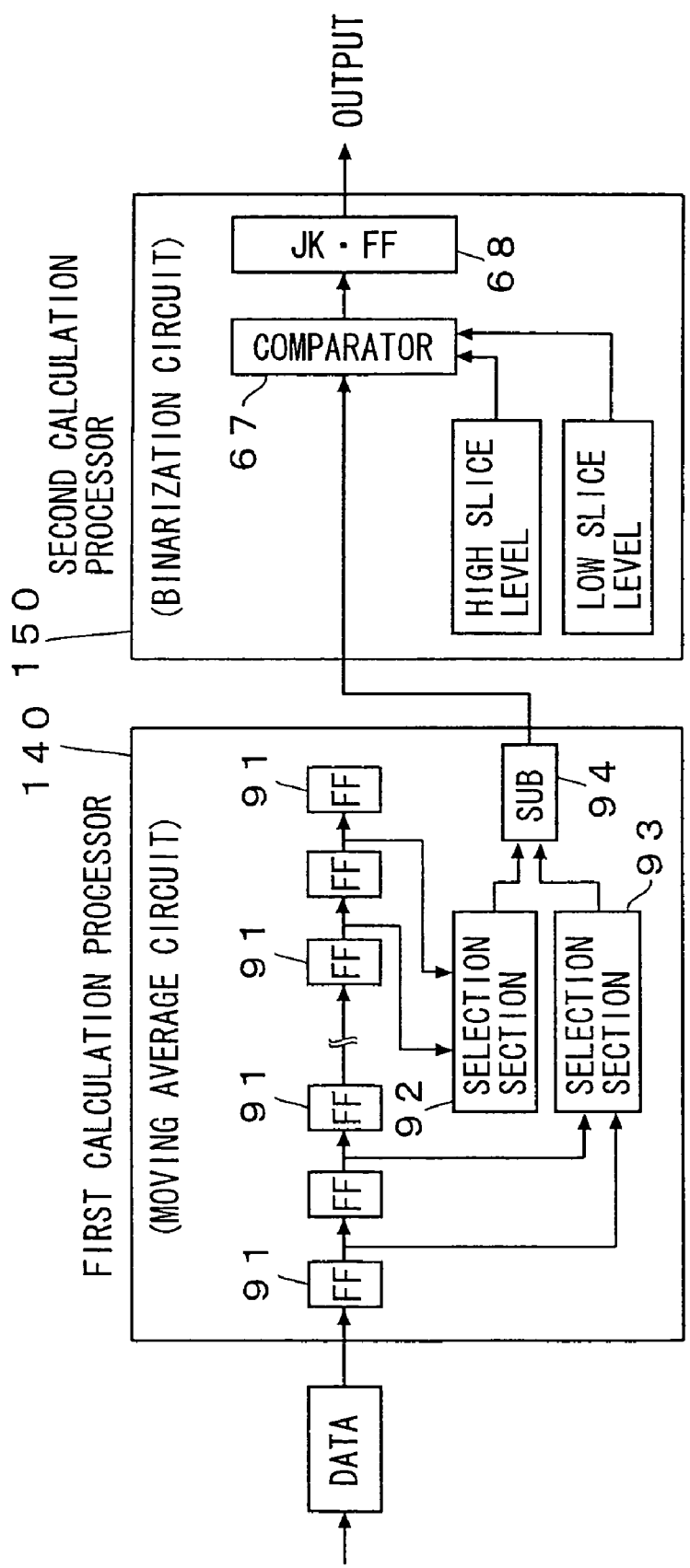
FIG. 21 is a block diagram showing basic circuit configurations of only a first calculation processor and a second calculation processor in a digital signal calculation unit of a multipurpose processing circuit block in another embodiment of the optical information reading apparatus according to the invention.

FIG. 21 is a block diagram showing a basic circuit configuration of only portions corresponding to the first calculation processor 14 and the second calculation processor 15 in the digital signal calculation unit shown in FIG. 5 of a multipurpose processing circuit block in an optical information reading apparatus.

In this embodiment, the first calculation processor 14 composed of the integration circuit and the second calculation processor 15 composed of the differentiation circuit in the digital signal calculation unit 17 are replaced with a first calculation processor 140 composed of a moving average circuit and a second calculation processor 150 composed of a binarization circuit, respectively, and the other portions of the digital signal calculation unit (DSCU) are the same as those of the digital signal calculation unit (DSCU) 17 in the above-described embodiment.

The first calculation processor 140 shown in FIG. 21, which constitutes a moving average circuit and has a buffer selecting function, comprises flip-flop circuits (FFs) 91 being a plurality of buffers, a plurality of selection sections 92 and 93, and a SUB (adder) 94.

The second calculation processor 150, which constitutes a binarization circuit, comprises a comparator 67 and a JK-FF 68 with the differentiator 65 and the peak detector 66 in the second calculation processor 15 shown in FIG. 7 being omitted.

FIG. 22 shows the relationship between an original signal (input signal) OR and a signal MA made by multiplying the original signal by a moving average and bar code binarized data when the bar code binarized data is generated using the moving average circuit by the first calculation processor 140 and the second calculation processor 150 as shown in FIG. 21. More specifically, the signal made by multiplying the waveform of the input signal by the moving average and the input signal are compared, and when the input data>the moving average data, the bar code binarized data is at high level, and when the input data<the moving average data, the bar code binarized data is at low level.

Although there are several ways of multiplying by the moving average, this embodiment uses a simple moving average and a weighted moving average, and therefore those will be explained.

The simple moving average is expressed by the following expression:

$$y[n] = \frac{1}{M+1} \sum x[n+k]$$

Figure 23:
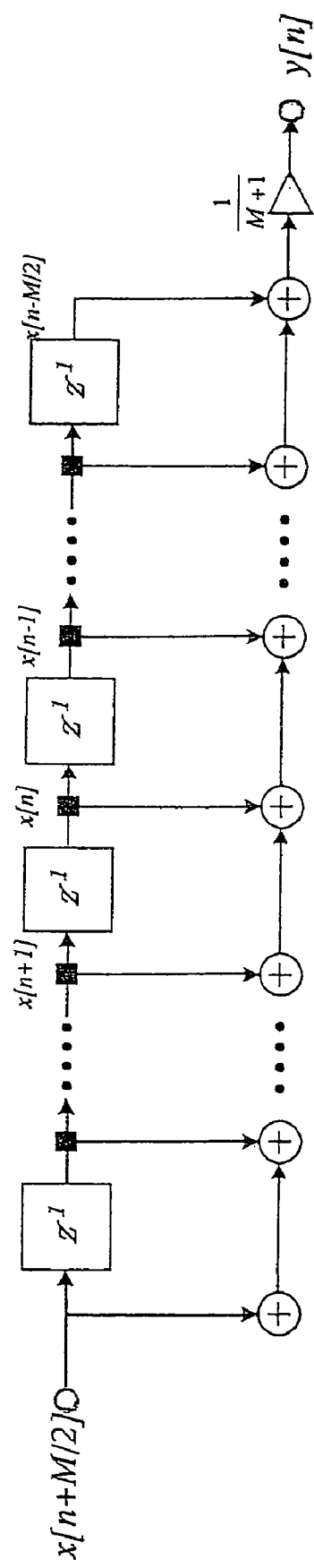
FIG. 23 is a block configuration diagram illustrating the principle of a simple moving average.

In this expression, k denotes a index, and a block configuration diagram illustrating the principle of the simple moving average when k=−M/2~M/2 is shown in FIG. 23.

In the drawing, k is of a past type when the sampling point is a negative number, and is of a future type when the sampling point is a positive number.

Typically, a bar code reader including the moving average circuit section tends to include much noise in bar code binarized data, as a decoder of the bar code reader, and therefore the following functions or configurations are added in this embodiment:

(1) a function of changing the moving average sampling width;
(2) employment of a weighted moving average method;
(3) separation of the moving average circuit into two parts;
(4) a function of changing the weighted amount of the weighted moving average;
(5) a function of changing frequency response of the weighted moving average;
(6) a function of selecting a maximum/minimum value in moving average sample data;
(7) a function of thinning out moving average sample data;
(8) a function of interpolating moving average sample data;
(9) a function of reducing the total of high frequency components from the total of low frequency components in the weighted moving average; and
(10) a function of changing M (a total number divisor) of weighted moving average.

First, the function (1) of changing the moving average sampling width will be explained.

As shown in FIG. 21, the first calculation processor 140 constituting the moving average circuit having the buffer selecting function captures the input data (DATA) in sequence into the FFs 91 being the plurality of buffers. The selection sections 92 and 93 select necessary data from among the data captured into each of the FFs 91 and send them to the SUB (adder) 94, and the SUB 94 sends the selected data out to the second calculation processor 150 that performs a subsequent processing process.

The changing the moving average sampling width means changing the frequency characteristics of a filter in accordance with the frequency component of the input data, and the changing can be coped with by changing the value of k in the above-described moving average expression and is coped with, in the circuit, by selecting an arbitrary point without changing the total number of buffers (FFs). This embodiment can cope with various frequencies in the above-described manner.

Figure 24:
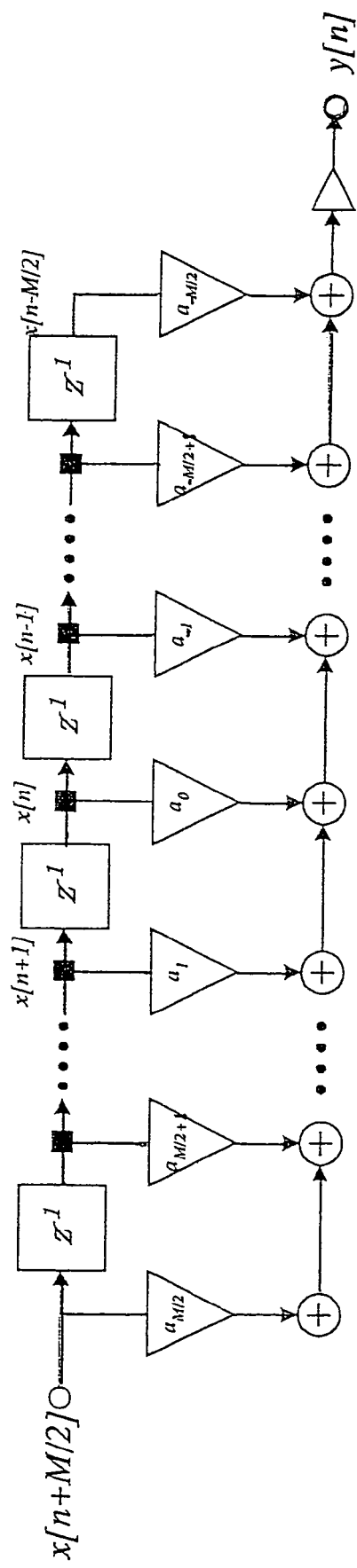
FIG. 24 is a block configuration diagram illustrating the principle of a weighted moving average.

Next, as for the employment (2) of a weighted moving average method, this method is expressed by the following expression, and a block configuration diagram illustrating the principle of the weighted moving average is shown in FIG. 24.

$$y[n] = \frac{1}{N} \sum_{k=-\frac{M}{2}}^{\frac{M}{2}} a_k x[n+k]$$

$$N = \sum_{k=-\frac{M}{2}}^{\frac{M}{2}} a_k$$

The employment of this method enables removal of external factors included in the waveform of the input data, for example, a gradient and so on. Further, various frequency components are combined by pairing moving average expressions, whereby a filter can be produced which is suitable for characteristics of an input waveform.

The point to note in this embodiment is that processing at a subsequent stage can be swiftly performed by making a power of two vertically at an individual point.

Figure 25:
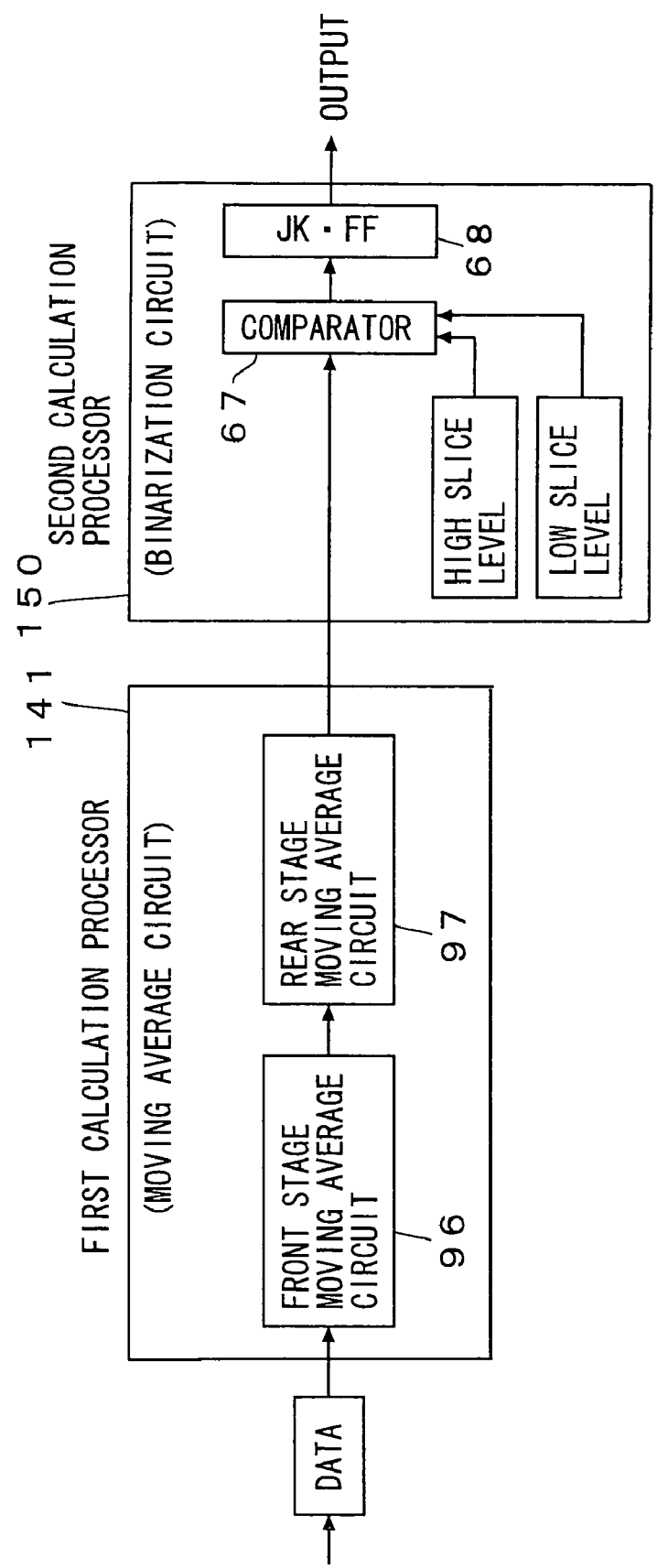
FIG. 25 is a block diagram showing an example in which the function of the first calculation processor in the embodiment shown in FIG. 21 is improved.

Next, as for the structure (3) of the moving average circuit separated in two parts, this is implemented by constituting a moving average circuit of a front stage moving average circuit 96 comprising three buffers (FFs) and a rear stage moving average circuit 97 comprising two buffers (FFs), as shown in a first calculation processor 141 in FIG. 25.

Here, a front stage moving average is expressed by the following upper expression, and a rear stage moving average is expressed by the following lower expression.

$$Y_0 = \frac{(X_{-1} + X_0 + X_{+1})}{3}$$

$$Z_0 = \frac{(Y_{-1} + Y_0)}{2} = \frac{\frac{(X_{-2} + X_{-1} + X_0)}{3} + \frac{(X_{-1} + X_0 + X_{+1})}{3}}{2}$$

Since the circuit tends to increase in size when the moving average is made to suit to low frequency characteristics, the filter circuit configuration is changed. In this case, rather than use of a filter including five buffers (FFs), use of filters, in combination, in which the five buffers are divided into three buffers and two buffers, provides increased effect due to the combination. The expression of the rear stage moving average clearly shows that this circuit has the same function as that of a circuit having six buffers, thus providing an advantage that the circuit can be substantially reduced in size.

The addition of the function (4) of changing the weighted amount in the weighted moving average method is explained next. An expression of weighted amount change at this time is expressed by the following expression.

$$y(i) = \frac{\sum_{j=0}^{N} x(n+j) + a \sum_{k=0}^{M} x(n+k)}{N + aM}$$

When the input data itself is at low level and its waveform is distorted, the waveform has no follow-up property, and therefore this function is added which changes the weighted amount to improve the follow-up property. As a result of this, a portion of data at low level ratio reaches a threshold level, so that the waveform also follows up noise, and therefore this function is used together with the function (5) of changing frequency response explained later.

Figure 26:
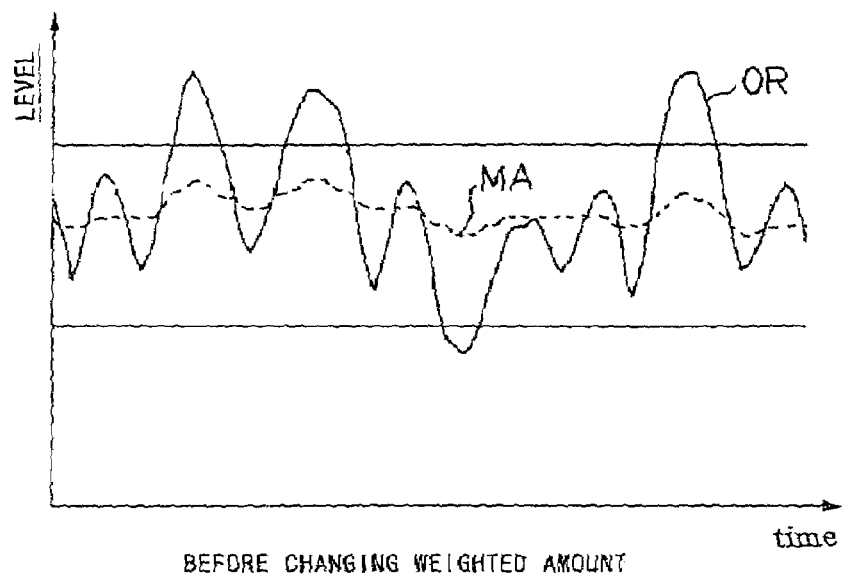
FIG. 26 is a waveform chart of an input signal and a signal made by multiplying the input signal by a weighted moving average before changing a weighted amount when a weighted moving average method is employed.
Figure 27:
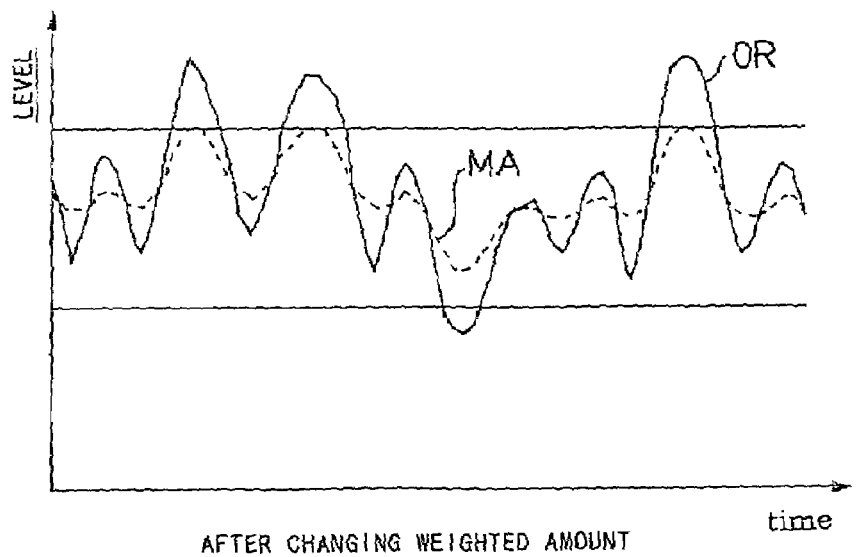
FIG. 27 is a waveform chart of the input signal and a signal made by multiplying the input signal by the weighted moving average after changing the weighted amount in the same case as in FIG. 26.

The addition of the function of changing the weighted amount results in that when an input signal (original signal) OR and a signal MA made by multiplying the input signal OR by the weighted moving average before changing the weighted amount have waveform characteristics as shown in FIG. 26, the input signal OR and the signal MA made by multiplying the input signal OR by the weighted moving average after changing the weighted amount have waveform characteristics as shown in FIG. 27.

Next, as for the addition of (5) the function of changing frequency response in the weighted moving average method, the function of changing frequency response, which is partially explained in the above paragraph of the function (4) of changing the weighted amount, is a function of eliminating noise, fluctuation, and so on.

An expression of frequency response change is expressed by the following expression.

$$y(i) = \frac{\sum_{j=0}^{N} x(n+j) + \sum_{k=0}^{M} x(n+k)}{N+M}$$

Figure 28:
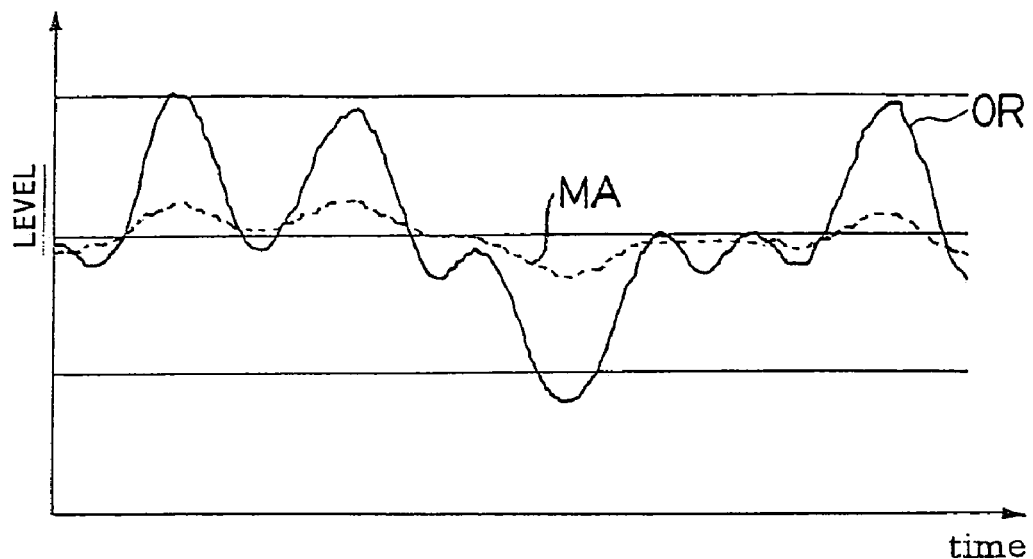
FIG. 28 is a waveform chart of an input signal and a signal made by multiplying the input signal by a weighted moving average before changing frequency characteristics when the weighted moving average method is employed.
Figure 29:
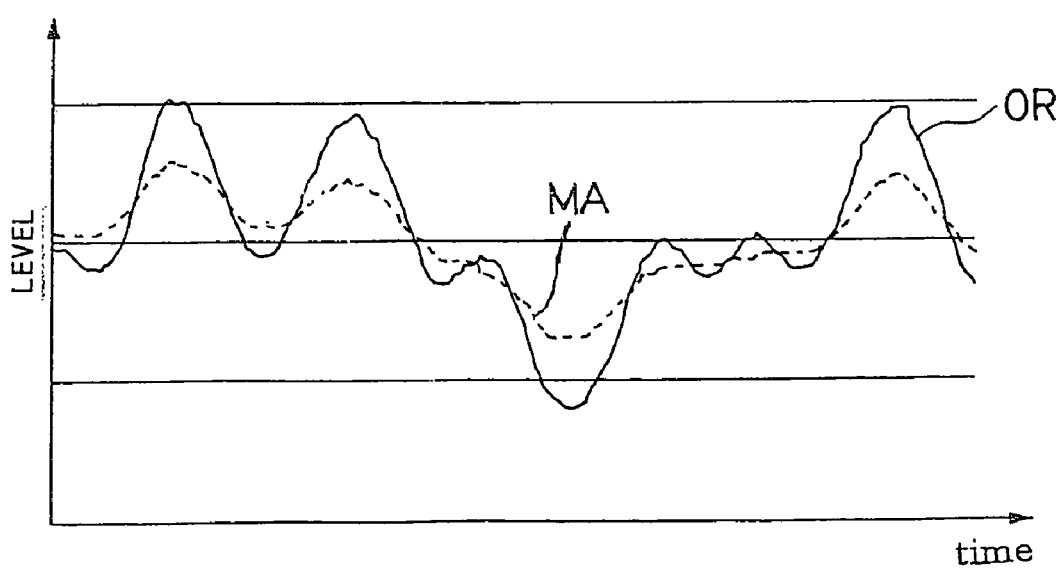
FIG. 29 is a waveform chart of the input signal and a signal made by multiplying the input signal by the weighted moving average after changing the frequency characteristics in the same case as in FIG. 28.

This function changes the frequency response of the filter in order to respond to characteristics of waveforms since the input data includes mixed waveforms with various frequency characteristics. This function eliminates noise, fluctuation, and so on. The addition of this function results in that when an input signal (original signal) OR and a signal MA made by multiplying the input signal OR by the weighted moving average before changing the frequency characteristics have waveform characteristics as shown in FIG. 28, the input signal OR and the signal MA made by multiplying the input signal OR by the weighted moving average after changing the frequency characteristics have waveform characteristics as shown in FIG. 29.

Next, as for the addition of the function (6) of selecting a maximum/minimum value in sample data, this function is added as a measure to cope with a singular point which is susceptible to the moving average expression.

In the method in use here, a maximum value max(n) and a minimum value min(n) are obtained by the following expressions, and a maximum or minimum point among n pieces is employed, whereby the influence on the singular point (noise) in the sample data is eliminated.

$$\max(n) = \underset{k=0}{\overset{n}{\text{MAX}}} x(n+k)$$

$$\min(n) = \underset{k=0}{\overset{n}{\text{MIN}}} x(n+k)$$

Here, the maximum value/minimum value is selected in accordance with the characteristics of the input data OR. When this is illustrated by a waveform, the waveform passing through a maximum value circuit is as shown by a broken line in FIG. 30, and the waveform passing through a minimum value circuit is as shown by a broken line in FIG. 31. In these drawings, OR denotes the input data, MA a signal made by multiplying OR by the weighted moving average, max a maximum value, and min a minimum value.

Figure 32:
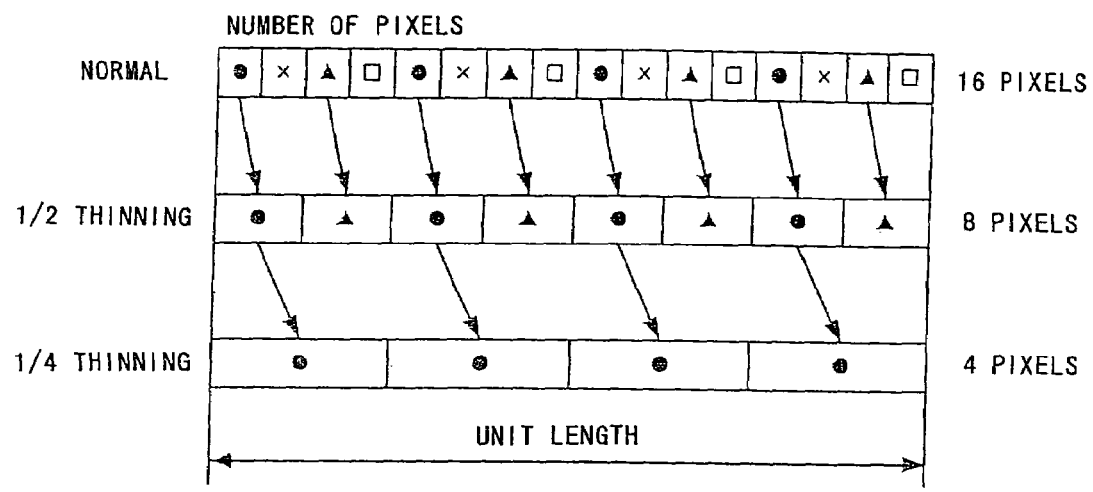
FIG. 32 is a conceptual diagram for explaining a sample data thinning-out function.

Next, the addition of the function (7) of thinning out sample data is explained. This is a function of reducing the number of pixels per unit length, and its concept is shown in FIG. 32.

This function provides an effect similar to that of a CCD scanner with a reduced resolution. This function theoretically means sampling with skips at arbitrary data intervals, and is effective for a low-resolution bar code reader.

As for the addition of the function (8) of interpolating moving average sample data, this function artificially inserts interpolating data between data to increase the resolution since the pulse width of the bar code binarized data slightly varies in Narrow/Wide ratio because of a great influence by the sampling rate. An interpolating expression is expressed by the following expressions, and the interpolating data is made by adding prior and subsequent data and dividing the resulting data by two.

$$y(h) = \frac{1}{2}(y(n) + y(n-1))$$

$$h = n - \frac{1}{2}$$

Figure 33:
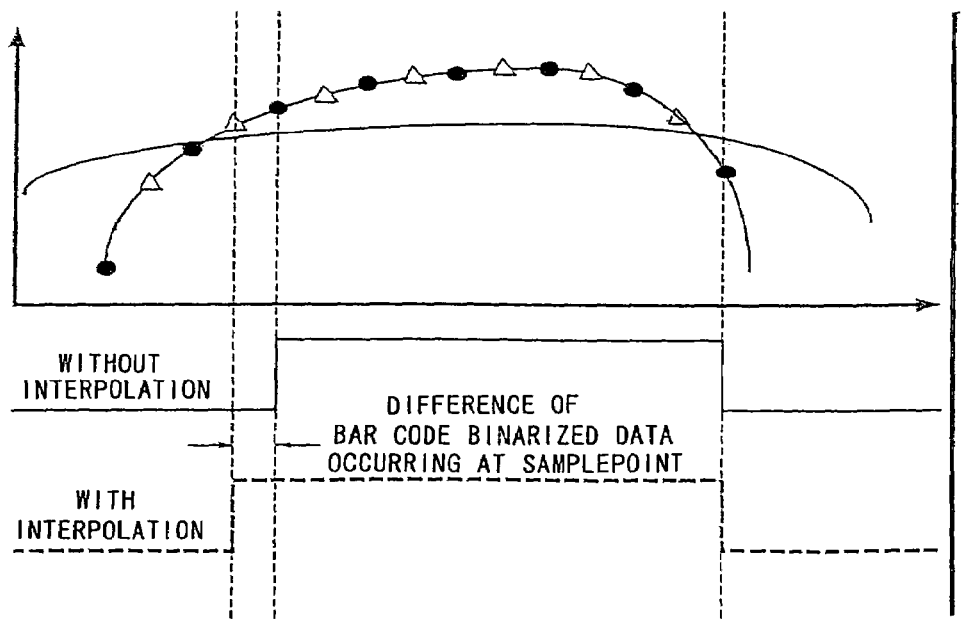
FIG. 33 is a diagram for explaining a sample data interpolating function.

The influence of this sampling rate exerted on the bar code binarized data is as shown in FIG. 33, in which a sample part becomes closer to the cross point, so that the width of the bar code binarized data can be taken more accurately. In FIG. 33, black circles denote normal points, and triangles denote interpolated points.

Next, as for the addition of the function (9) of reducing the total of high frequency components from the total of low frequency components in the weighted moving average method, when data itself changes little in amount, noise may occurs even if the threshold level is moved, and, in this case, this function reduces the total data of a high frequency from that of a low frequency. This reduction makes only the high frequency components have a waveform in a reverse phase while the low frequency characteristics are maintained.

Figure 34:
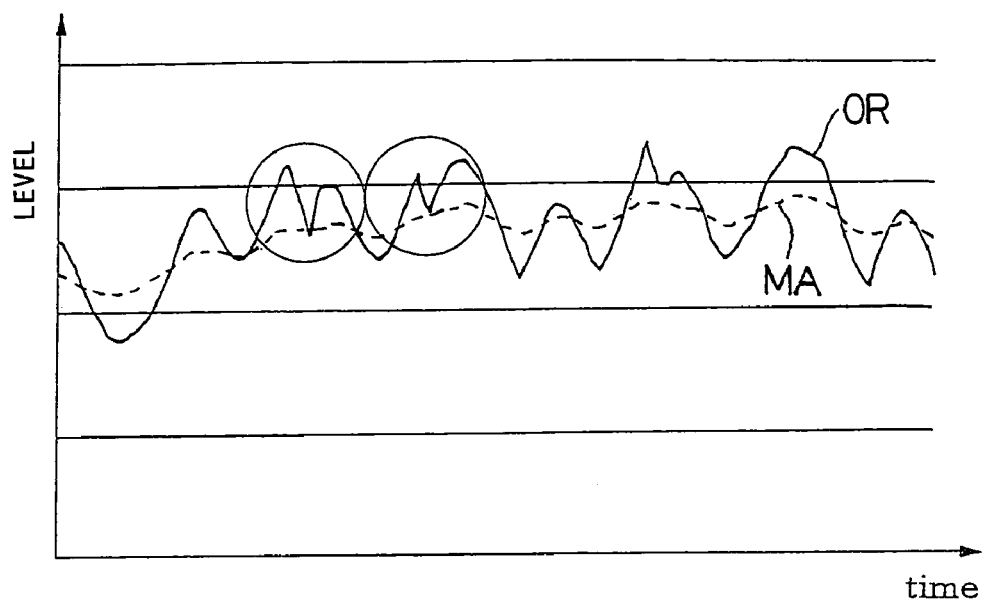
FIG. 34 is a waveform chart showing an original signal and a signal made by multiplying the original signal by a weighted moving average when a highly weighting stage is added in the case of addition of a function of reducing the total of high frequency components from the total of low frequency components in the weighted moving average method.

The waveform when a highly weighting stage is added is expressed by $y(n)=(y1+y2y3+y4)$/total number of points and a signal MA made by multiplying an original signal OR by the weighted moving average has a waveform as shown in FIG. 34.

Figure 35:
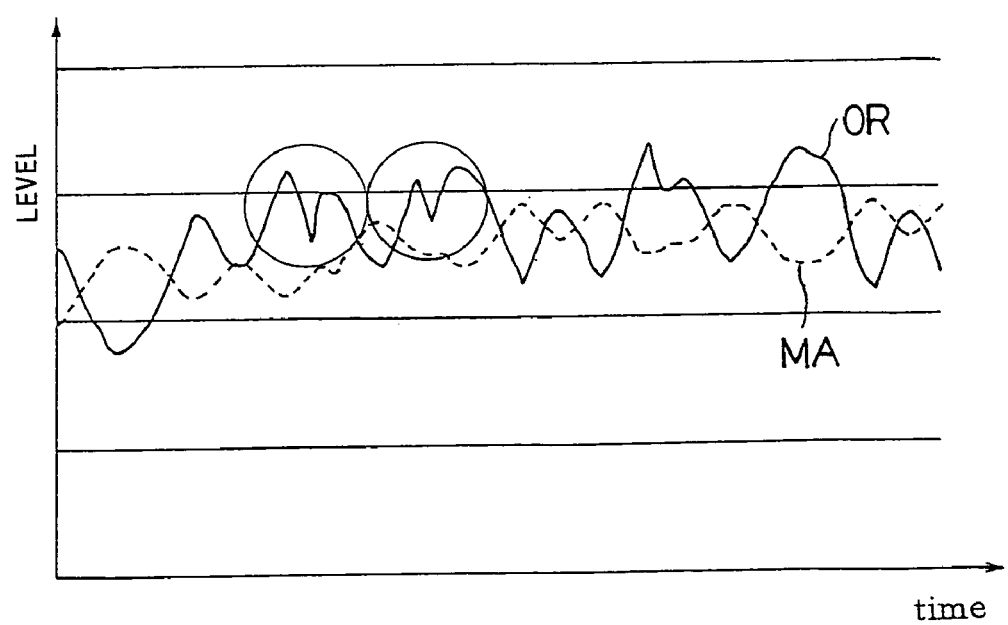
FIG. 35 is a waveform chart showing the original signal and a signal made by multiplying the original signal by the weighted moving average when the highly weighting stage is reduced in the same case as in FIG. 34.

The waveform when the highly weighting stage is reduced is expressed by $y(n)=\{(y1+y2)-(y3+y4)\}$/total number of points and a signal MA made by the original signal OR by the weighted moving average has a waveform as shown in FIG. 35.

Finally, the addition of the function (10) of changing M (a total divisor) of weighted moving average is explained. When there are many singular points (noises) in bar code data with a large width, the singular points intersect the threshold levels to exert adverse effect on the waveform, and therefore for prevention of the effect, this function increases the coefficient M at this time to be larger than the actual total number, whereby the moving average value decreases in threshold width and the singular points become closer to the middle of the input data amplitude, so that a position where the data intersects the threshold level is not affected by the singular points.

Figure 36:
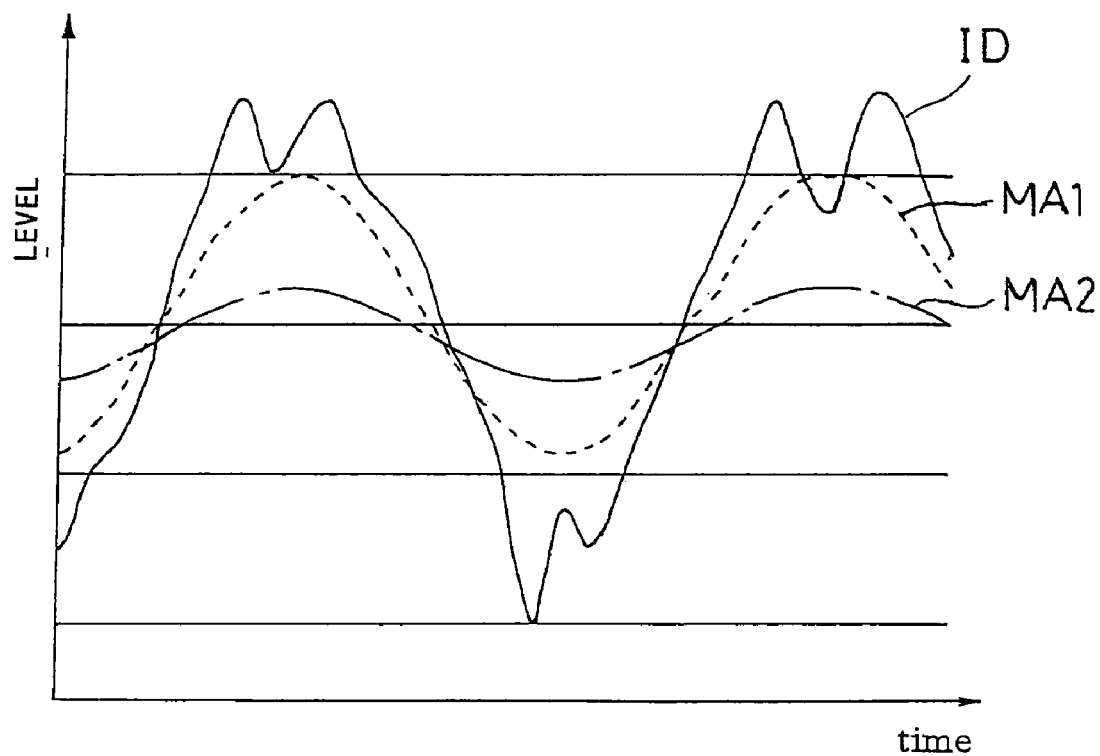
FIG. 36 is a waveform chart of signals made by multiplying input data by a weighted moving average when M (the total divisor) of the weighted moving average is changed.

Here, waveforms in accordance with changes of the coefficient M are as shown in FIG. 36. In this drawing, ID shows the waveform of the input data, MA1 the waveform of a signal made by multiplying the input data by the weighted moving average when the total divisor is a real number, and MA2 the waveform of a signal made by multiplying the input data by the weighted moving average when the total divisor is doubled.

The optical information reading apparatus including the multipurpose processing circuit block according to the invention has been described, and the details of the configuration and function of the digital signal calculation unit thereof have been explained in particular.

Further, the specific configuration examples, their operations, various additional functions, and so on of the first calculation processor and the second calculation processor, in particular, in the configuration of the digital signal calculation unit have been explained. As embodiments of the unit, the example using a differentiation circuit and the example using a moving average circuit have been described, and, in addition to these, it is also possible to configure the digital signal calculation unit using an FIR (finite impulse response) digital filter or using IIR (infinite impulse response) digital filter, as the first calculation processor.

Though the configuration in which the multipurpose processing circuit block including the central processing unit is formed on the single substrate has been described in each of the above embodiments, it is not denied that even an optical information reading apparatus having a configuration in which only the central processing unit is separately configured, or a part of the above-described multipurpose processing circuit block is separately formed can be an embodiment of the invention as long as the apparatus has a configuration with no difference in object and effect of the invention.

INDUSTRIAL APPLICABILITY

As has been described, in the optical information reading apparatus according to the invention, processing circuits such as the AD conversion circuit, the binarization processing circuit, the decoder, the interface, and so on are formed on a single substrate to constitute a multipurpose processing circuit, through use of which the optical information reading apparatus obtains the following effects.

(1) Variations in processing performance can be eliminated with no influence of variable factors such as a change in amplification rate, temperature, and so on. This is shown in the drawings as follows. Hereinafter, in each drawing, analog bar code data is shown by BCD, and bar code binarized data is shown by BBD.

Figure 37:
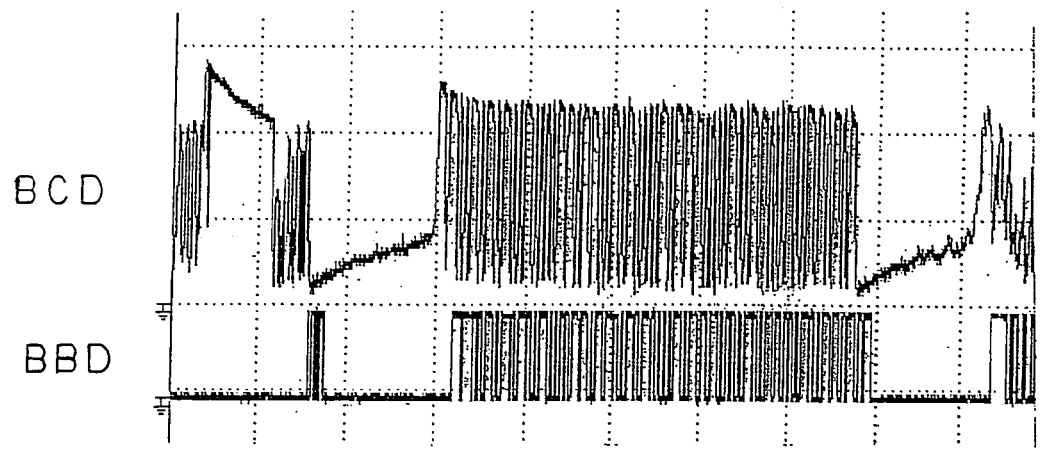
FIG. 37 is a waveform chart of bar code data when an amplification rate is high and binarized data thereof, for explaining the effect on the variations in the amplification rate according to the invention.
Figure 38:
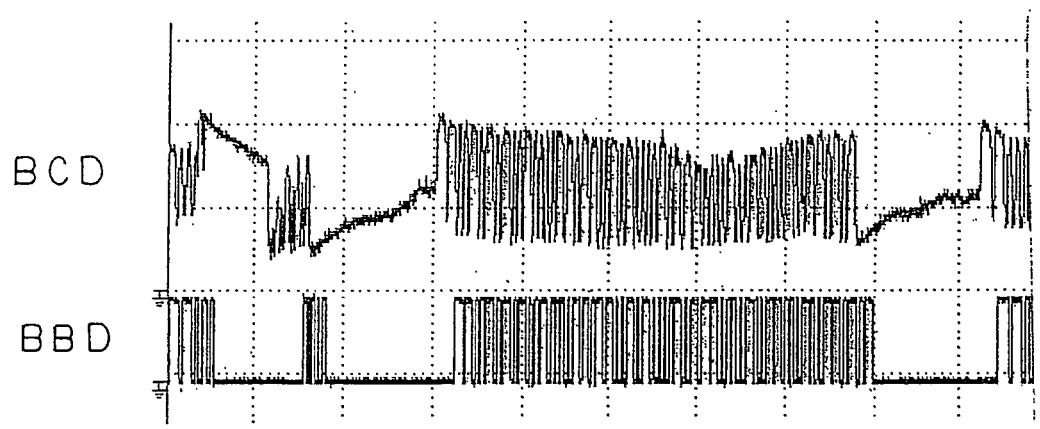
FIG. 38 is a waveform chart when the amplification rate is low in the same case as in FIG. 37.

① Influences by high and low amplification rates on the bar code binarized data are as illustrated by waveforms that are respectively shown
 a) in FIG. 37 when the amplification rate is high, and
 b) in FIG. 38 when the amplification rate is low, in which a remarkable effect is obtained. More specifically, the bar code data is large when the amplification rate is high, and the bar code data is small when the amplification rate is low, but both the bar code binarized data which have been subjected to calculation processing using the processing circuit of the invention have the same size and no variations.

Figure 39:
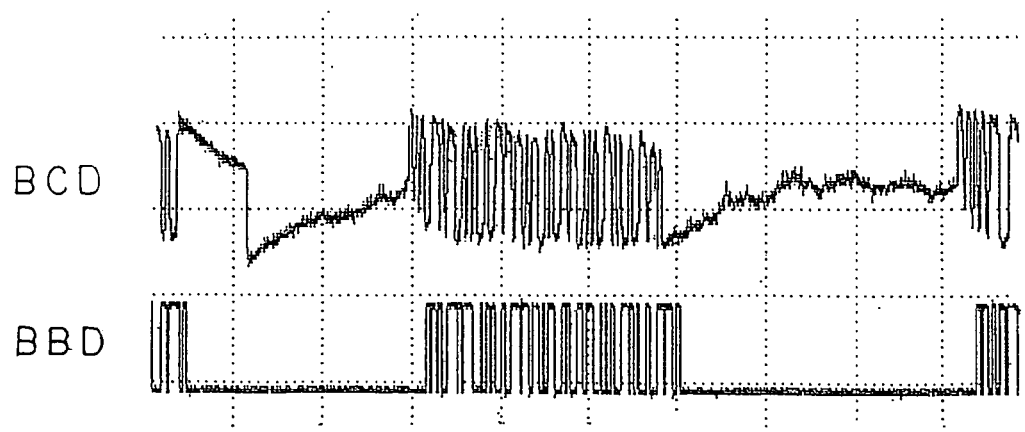
FIG. 39 is a waveform chart of bar code data in the case of a high temperature and binarized data thereof, for explaining the effect on a change in temperature according to the invention.

② Influences by temperature changes on the bar code binarized data are as illustrated by waveforms that are respectively shown
 a) in FIG. 39 in the case of a high temperature (+45° C.), and
 b) in FIG. 40 in the case of a low temperature (−5° C.), in which a remarkable effect is obtained. More specifically, the bar code data is relatively small in the case of a high temperature, and the bar code data is large in the case of a low temperature, but both the bar code binarized data which have been subjected to calculation processing using the processing circuit of the invention have the same size and no variations.

(2) The processing ability is improved which is not affected by the printing quality (gradation or the like) of a bar code symbol, and no variations occur in the bar code binarized data.

The obtained waveforms are shown
 a) in FIG. 41 when the printing density is low, and
 b) in FIG. 42 when the printing density is high, which shows that even if there is gradation in the printing quality of the bar code symbol and bar code data has thus variations, both the bar code binarized data which have been subjected to calculation processing using the processing circuit of the invention become data having the same size and no variations.

(3) Selection of the calculation processing method enables arbitrary and easy selection from among various digital processing methods in accordance with a purpose, and realizes an increase in speed of processing ability.

(4) A reduction in size, price, and power consumption of the entire optical information reading apparatus are realized.

What is claimed is:

1. An optical information reading apparatus, comprising:
 a light projection means for projecting light to an object to be read having portions with different light reflectances;
 a reflector for deflecting the reflected light from the object to be read;
 an imaging optical system for forming an image of deflected light by the reflector a light receiving position;
 a photoelectric conversion means located at the light receiving position for photoelectrically converting the image made of the deflected light and outputting an electric signal; and
 a calculation means for calculating the electric signal outputted from said photoelectric conversion means and outputting bar code binarized data indicating information of the object to be read;
 said calculation means forms a multipurpose processing circuit by integrally providing, on a single substrate;
 a data converter for converting the electric signal into a digital signal;
 a digital signal calculation unit having a calculation processor for calculating the digital signal converted by said data converter and generating bar code binarized data, a data correction section for correcting the bar code binarized data, and a noise reduction section for reducing noises, for outputting the bar code binarized data indicating information of the object to be read;

an input accumulation unit for accumulating the bar code binarized data output from said digital signal calculation unit; and a timing control unit for controlling operation timings of said light projection means, said photoelectric conversion means, said data converter, said digital signal calculation unit, and said input accumulation unit.

2. The optical information reading apparatus according to claim 1, wherein said multipurpose processing circuit is integrally formed on the single substrate while also including a central processing unit (CPU) for centrally controlling respective units of said calculation means.

3. The optical information reading apparatus according to claim 1, wherein said calculation unit comprises:

a first calculation processor for calculating the digital signal converted by said data converter; and a second calculation processor for generating the bar code binarized data from data calculated by said first calculation processor.

4. The optical information reading apparatus according to claim 3, wherein:

said first calculation processor has an offset buffer to give an offset to the digital signal, and two integrators for integrating respectively said digital signal and a digital signal given the offset by the offset buffer through a shift register; and said second calculation processor comprises a differentiator for differentiating an integrated data output from two integrators and a binarization circuit for generating the bar code binarized data from a differentiated data output from the integrators.

5. The optical information reading apparatus according to claim 4, wherein means for varying a differential time (Δt) in the differentiator of said second calculation processor is provided.

6. The optical information reading apparatus according to claim 4, wherein said first calculation processor is provided with a low-pass filter in front of the shift register as a noise filter for eliminating or reducing noises of the digital signal.

7. The optical information reading apparatus according to claim 4, wherein the data correction section has a function of eliminating a part being a data erase level or less of an input data into said second calculation processor out of the bar code binarized data generated by said second calculation processor.

8. The optical information reading apparatus according to claim 4, wherein said noise reduction section has a function of erasing a pals being set pals width or less from the bar code binarized data and keeping at level before change.

9. The optical information reading apparatus according to claim 4, wherein a reset section for forcibly resetting binarized data keeping a state of a high level "H" continuing for a predetermined length or longer out of the bar code binarized data generated in said second calculation processor is provided.

10. The optical information reading apparatus according to claim 3, wherein:

said first calculation processor comprises a moving average circuit for generating a moving average data from said moving digital signal; and said second calculation processor comprises a binarization circuit for generating the bar code binarized data using the moving average data.

11. The optical information reading apparatus according to claim 10, wherein the moving average circuit of said first calculation processor comprises plural flip-flop circuits for capturing said digital signal sequentially and plural selection sections for selection necessary data out of captured data into each flip-flop circuit, and an adder for adding the selected data by the selection sections.

12. The optical information reading apparatus according to claim 10, wherein said moving average circuit is a weighted moving average circuit.

13. The optical information reading apparatus according to claim 12, wherein said moving average circuit has means for changing weighted amount of said weighted moving average circuit.

14. The optical information reading apparatus according to claim 12, wherein said moving average circuit has means for changing frequency response of said weighted moving average circuit.

15. The optical information reading apparatus according to claim 12, wherein said moving average circuit has means for reducing a total of high frequency components from a total of low frequency components in weight average by said weighted moving average circuit.

16. The optical information reading apparatus according to claim 10, wherein said moving average circuit is comprised of a front stage moving average circuit and a rear stage moving average circuit separately.

* * * * *

UNITED STATES PATENT AND TRADEMARK OFFICE
CERTIFICATE OF CORRECTION

PATENT NO. : 6,945,462 B2
DATED : September 20, 2005
INVENTOR(S) : Sachio Tsukuda et al.

It is certified that error appears in the above-identified patent and that said Letters Patent is hereby corrected as shown below:

Column 20,
Line 48, correct "the reflector a light" to -- the reflector on a light --.
Line 57, correct "to be read;" to -- to be read, --.
Line 59, correct "a single substrate;" to -- a single substrate, --.

Signed and Sealed this

Third Day of January, 2006

JON W. DUDAS
*Director of the United States Patent and Trademark Office*